(12) United States Patent
Van Deventer et al.

(10) Patent No.: US 8,839,340 B2
(45) Date of Patent: Sep. 16, 2014

(54) METHOD, SYSTEM AND DEVICE FOR SYNCHRONIZATION OF MEDIA STREAMS

(75) Inventors: Mattijs Oskar Van Deventer, Leidschendam (NL); Hans Maarten Stokking, Wateringen (NL); Fabian Arthur Walraven, Groningen (NL); Omar Aziz Niamut, Vlaardingen (NL)

(73) Assignees: Koninklijke KPN N.V., The Hague (NL); Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/522,974

(22) PCT Filed: Jan. 27, 2011

(86) PCT No.: PCT/EP2011/051143
§ 371 (c)(1),
(2), (4) Date: Aug. 14, 2012

(87) PCT Pub. No.: WO2011/092244
PCT Pub. Date: Aug. 4, 2011

(65) Prior Publication Data
US 2012/0324520 A1    Dec. 20, 2012

(30) Foreign Application Priority Data
Jan. 27, 2010    (EP) ..................... 10000790

(51) Int. Cl.
*H04N 7/16*      (2011.01)
*H04L 29/06*    (2006.01)

(52) U.S. Cl.
CPC ............ *H04L 65/605* (2013.01); *H04L 65/607* (2013.01); *H04L 65/80* (2013.01)
USPC ........... 725/149; 725/148; 725/146; 370/508; 370/517

(58) Field of Classification Search
USPC .......... 348/500, 518; 370/503–510, 517–519; 725/148, 149, 146
See application file for complete search history.

(56) References Cited

U.S. PATENT DOCUMENTS 5,471,510 A * 11/1995 Renault et al. ............... 375/372
5,623,483 A *  4/1997 Agrawal et al. .............. 370/253
(Continued)

FOREIGN PATENT DOCUMENTS

EP    1860866       11/2007
EP    1860866 A1    11/2007
(Continued)

OTHER PUBLICATIONS

European Search Report, mailed Jun. 4, 2010 in connection with European Patent Application No. 10000790.5.

(Continued)

*Primary Examiner* — Pankaj Kumar
*Assistant Examiner* — Timothy Newlin
(74) *Attorney, Agent, or Firm* — Hamilton, Brook, Smith & Reynolds, P.C.

(57) ABSTRACT

Methods and systems for synchronizing a first and second media stream are describe, wherein said first and second media stream are being transmitted by at least one media source in a network via a first and second media path to one or more terminals. The method comprises: measuring timing information associated with arrival times of media packets in said first and second media stream using a measuring module positioned at a first location in said first and second media paths; in said network generating buffer instructions for at least one buffer on the basis of said timing information, said buffer being positioned at a second location in at least one of said first or second media path; and, delaying one or more media packets transmitted over said media path to said one or more terminals such that arrival times of media packets at said one or more terminals are substantially synchronized.

24 Claims, 12 Drawing Sheets

(56) References Cited

U.S. PATENT DOCUMENTS

| | | | |
|---|---|---|---|
| 7,289,451 B2 * | 10/2007 | Bruhn | 370/252 |
| 7,680,153 B2 * | 3/2010 | Ma | 370/503 |
| 7,843,818 B2 * | 11/2010 | Chu et al. | 370/230 |
| 7,992,177 B2 * | 8/2011 | Perry et al. | 725/81 |
| 2003/0063627 A1 * | 4/2003 | Toshitani | 370/503 |
| 2003/0067944 A1 * | 4/2003 | Sala et al. | 370/474 |
| 2008/0117937 A1 * | 5/2008 | Firestone et al. | 370/503 |
| 2009/0257455 A1 * | 10/2009 | Sukkar et al. | 370/503 |

FOREIGN PATENT DOCUMENTS

| | | |
|---|---|---|
| JP | 2004-104796 A | 4/2004 |
| JP | 2007-300498 A | 11/2007 |
| JP | 2011-509543 A | 3/2011 |
| WO | 9944363 | 9/1999 |
| WO | WO 99/44363 | 9/1999 |
| WO | 0152553 | 7/2001 |
| WO | WO 01/52553 A1 | 7/2001 |
| WO | WO 2009/053072 | 4/2009 |
| WO | WO 2009/071321 A1 | 6/2009 |

OTHER PUBLICATIONS

International Search Report, mailed Feb. 16, 2011 in connection with International Patent Application PCT/EP2011/051143.

Boronat, F. et al., "Multimedia group and inter-stream synchronization techniques: A comparative study," *Information Systems*, 34:108-131 (2009).

* cited by examiner

METHOD, SYSTEM AND DEVICE FOR SYNCHRONIZATION OF MEDIA STREAMS

PRIORITY CLAIM TO RELATED APPLICATIONS

This application is a national stage application under 35 U.S.C. §371 of PCT/EP2011/051143, filed Jan. 27, 2011, published as WO 2011/092244 A1 on Aug. 4, 2011, and claiming priority to European Application No. 10000790.5, filed Jan. 27, 2010, which application and publication is incorporated herein by reference and made a part hereof in its entirety, and the benefit of priority of which is claimed herein.

FIELD OF THE INVENTION

The invention relates to synchronization of media streams, and, in particular, though not necessarily, to a method and a system for synchronizing a first and second media stream, a buffer, a synchronization server and a terminal for use in such system and a computer product program using such method.

BACKGROUND OF THE INVENTION

New multi-media techniques such as Voice over IP (VoIP) and Internet Protocol Television (IPTV) open a whole range of new multi-media services. One type of these services enable a group of users to separately watch the same TV channel and communicate with each other using text, audio and/or video. Another type of these services provide interactive television experiences, such as a broadcasted television quiz wherein viewers at home may input answers to broadcasted questions and participate in the show. Such services require that the output signal of the terminals is transmitted at the same time to all users in the group. In other words, the outputs of the display or play-out devices in the group e.g. televisions, PDAs, mobile devices, PCs or a combination thereof, corresponding to different destinations, should be synchronized.

In an IPTV system, the TV channel signal is typically transmitted as one or more packetized streams over a high-bandwidth IP network of an operator via network nodes such as head-ends, edge routers and access nodes to the terminals of the subscribers to such services. During transmission of the streams, the packets are subjected to unknown delays in the network such as transmission delays, differences in network routes and differences in coding and decoding delays. As a consequence the temporal relationship between packets of audio and video streams received at a first terminal (a first destination) and those received at another second terminal (a second destination) will be disturbed.

To stream the IPTV content to the terminals usually the Real-Time Transport Protocol (RTP) is used. RTP provides sequence numbering and time stamping. Using RTP the temporal relation in one stream (intra-stream synchronization), between associated streams terminating at the same end-terminal (inter-stream synchronization) or between associated streams terminating at different end-terminals (group-synchronization or inter-destination synchronization) may be restored. This invention is also applicable to other media transport protocols, e.g. using MPEG Transport Stream over UDP or using HTTP as transport protocol. The article "Multimedia group and inter-stream synchronization techniques: A comparative study" by F. Boronat et al. (Elsevier Information Systems 34 (2009) pp. 108-131) provides a comprehensive overview of known inter-destination synchronization techniques.

The referenced inter-destination synchronization techniques may be sub-divided in three main categories. In the "Synchronization Maestro Scheme" (SMS), a central synchronization master collects timing information from all terminals in the group and adjusts the output timing by distributing control packets to the terminals. In the "Master-Slave Receiver Scheme" (MSRS), receivers (terminals) are classified into a master receiver and slave receivers. The master receiver multi-casts its output timing to the slave receivers, which adjust their output timing of packets accordingly. In the "Distributed Control Scheme" (DCS), each terminal (receiver) multicasts all timing information to all other terminals in the group and terminal is configured for calculating the appropriate output timing. These schemes have in common that the synchronization takes place either at the source or receiving end of a media stream.

WO2009/053072 describes a further network-controlled inter-destination synchronization scheme wherein network nodes, e.g. at border network node in the media path, provide inter-destination synchronization of user equipment connected thereto. This method is particularly suitable for large scale deployment and services that tolerate small differences, e.g. in the order of standard jitter, in propagation times of streams resulting from differences in the access lines that connect the stream destinations to an operator network. Synchronization is realized by implementing a synchronization entity, e.g. a synchronization client, in the designated network node, wherein the synchronization entity is configured to measure information on the arrival time of packets, to report these measured times in synchronization status information to a synchronization server and to receive synchronization settings instructions from the synchronization server to instruct its variable delay buffer.

One problem related to a synchronization scheme residing in the network is that it cannot cope with, or at least have difficulties handling situations wherein the stream between the synchronizing network node and the receiver is modified by a transcoder for content preparation and/or content regeneration purposes (e.g. for conversion from a high definition (HD) to standard definition (SD), MPEG-3 to MPEG-2 and/or from a high bit rate to a lower bit rate). These modifications may introduce substantial delays that may not be compensated for by the synchronizing network node. Further, differences in the UE's resulting in different decoding delays and jitter buffer settings may cause additional delays which may cause an increase of delays and delay differences between UE's that may no longer be tolerable when using certain services.

Another problem relates to the fact that a synchronization scheme residing in the network requires a network node, which is configured to measure media unit arrival times. Such functionality requires deep packet inspection wherein at least header information of different media packets, e.g. RTP headers or MPEG TS headers, must be filtered in order to enable reporting on packet arrival time. Considering that under certain circumstances it may be desirable that a synchronization network node may process many different media transport protocols (including proprietary transport protocols) implementation of such functionality in a network node, which is mainly configured for routing functions, may become complex and expensive.

In summary, all known inter-destination-synchronization schemes may each have their own disadvantages, such as, but not limited to: inefficient use of buffering resources (for example when each end-terminal would require a large additional buffer), zapping (resynchronization) delays during channel changes, imprecise delay measurements.

Hence, there is a need in the art for improved methods, systems and devices, which may provide efficient network-controllable synchronization of media play-out of one or more terminals.

SUMMARY OF THE INVENTION

It is an object of the invention to reduce or eliminate at least one of the drawbacks of known service provisioning systems. In a first aspect the invention may relate to a method for synchronizing a first and second media stream, wherein said first and second media stream is transmitted by at least one media source in a network via a first and second media path to one or more terminals and wherein the method comprises the steps of: measuring timing information associated with arrival times of media packets in said first and second media stream using a measuring module positioned at a first location in said first and second media paths; in said network generating buffer instructions for at least one buffer on the basis of said timing information, said buffer being positioned at a second location in at least one of said first or second media path; and, delaying one or more media packets transmitted over said media path to said one or more terminals such that arrival times of media packets at said one or more terminals are substantially synchronized.

In one embodiment said first media path may be provided between said media source and a first terminal and said second media path may be provided between said media source and a second terminal. Such configuration thus provides a scheme for an inter-destination synchronization.

In another embodiment, said measuring module may be located in said one or more terminals or at a position along the one or more access-lines connecting said one or more terminals to said network; and/or said buffer may be located in said network; preferably in a border network node and/or access network node.

In yet a further embodiment, the buffer may be located in the home gateway or comparable functionality at the home location. The advantage being that the terminals residing behind the home gateway do not need to individually have the additional buffering capacity, but may still each comprise measuring modules for measuring time information so that respective individual delays may still be determined.

This may be particularly relevant if different terminals reside behind the home gateway, experiencing different delays, for example due to stream adaptation at the home gateway (such as transcoding, mixing, scalable video codec related activities or the like)

In another embodiment the measuring module may be located in the home gateway and the buffer in a node further in the network. This has the advantage that the terminals behind the buffer need not be adapted any more with a measuring module. Also the home gateway need not have additional buffering capacity, since this is taken care of by a further node in the network. Finally because of network address translation issues, end-terminals may not be able to directly receive an original multicast stream, and may therefore not provide the most ideal measuring point.

In yet another embodiment, the measuring module may be located in the home gateway, but the buffers in the terminals. This may be advantageous, since it does only require adaptation of the home gateways and terminals, but does not require adaptation of further nodes in the network.

In an embodiment the home gateway acts as a network node according to the invention, or acts as a terminal according to the invention.

In a further embodiment, said buffer instructions may be generated by a synchronization server, preferably a media synchronization application server; and said measuring module and said buffer may be configured as synchronization measuring client and a synchronization buffering client respectively. The method may further comprise the steps of receiving timing information from said synchronization measuring client; and, transmitting buffer instructions to said synchronization buffering client.

In yet another embodiment buffer instructions may be sent in one or more synchronization settings instructions reports, preferably RTCP synchronization settings instructions reports, to the synchronization buffering client; and/or timing information may be sent in one or more synchronization status information reports to the synchronization server.

In one embodiment said synchronization status information reports may be sent via said synchronization buffering client to said synchronization server.

In a variant the synchronization buffering client may be configured to modify synchronization status information reports sent from a terminal to the synchronization server; and/or said synchronization buffering client may be configured to forward synchronization settings instructions reports to a terminal.

In another variant the first media path may be provided between a first media source and a terminal and said second media path may be provided between said first media source or a further second media source and said terminal.

In yet another variant said first measuring module may be located in a network node, preferably in a border network node and/or access network node; and, said buffer may be located in said one or more terminals or at a position along the one or more access-lines connecting said one or more terminals to said network.

In a further variant at least one of said one or more terminals may be configured to measure variations between the arrival times of media packets in a media stream and to determine on the basis of said arrival time measurement whether a variation relates to a delay originating from a buffering point.

In yet a further variant said buffer may comprise a variable delay buffer configured to delay a media stream on the basis of delay instructions received from the network. In one embodiment said delay may be selected between 0.5 and 10 second, preferably between 1 and 5 seconds; In another embodiment said buffer point may be shared between two or more terminals connected to said buffer.

In another aspect the invention may relate to a system for synchronizing a first and second media stream, the system comprising: at least one media source transmitting a first and second media stream via a first and second media path to one or more terminals; at least one measuring module for measuring timing information associated with media packets in said first and second media stream received by said at least one measuring module, said measuring module being positioned at a first location in said first and second media paths; at least one buffer being configured to delay media packets transmitted over a media path to said one or more terminals on the basis of delay instructions, said buffer being positioned at a second location in at least one of said first or second media paths; and, a synchronization server for generating buffer instructions for said at least one buffer on the basis of said timing information such that arrival times of media packets at said one or more terminals are substantially synchronized.

In a further aspect, the invention may relate to a buffer module, preferably a synchronization buffering client, said buffer module being configured to delay media transmitted over a media path to a terminal on the basis of buffer instructions; said buffer module comprising: a variable delay buffer; a receiver for receiving buffer instructions, said buffer instructions providing the variable delay with information for delaying a media stream for a predetermined delay period; a sender for transmitting one or more delayed media streams to one or more terminals; and, optionally, a buffer list comprising pointer information, said pointer information allowing the buffer module to share the media packets in the variable delay buffer amongst two or more terminals.

In yet further aspect the invention may relate to a synchronization server, wherein said synchronization server may comprise: a receiver for receiving timing information associated with arrival times of media packet in one or more media streams; a processor configured to generate buffer instructions, said buffer instructions comprising delay information calculated on the basis of the timing information; a sender for transmitting the buffer instructions to at least one buffer.

In another aspect the invention may relate to a terminal for media play-out, wherein said terminal may comprise: a measuring module for measuring timing information associated with arrival times of media packets received by the terminal; a sender for transmitting timing information to a synchronization server in the network; and, optionally, a measuring unit for measuring variations between the arrival time of media packets in a media stream and to determine on the basis of said measurement whether a variation relates to a delay originating from a buffering point.

The invention may also relate to a computer program product comprising software code portions configured for, when run on a computer, executing the method according to any of the method steps as described above.

The invention will be further illustrated with reference to the attached drawings, which schematically show embodiments according to the invention. It will be understood that the invention is not in any way restricted to these specific embodiments.

DETAILED DESCRIPTION

Figure 1:
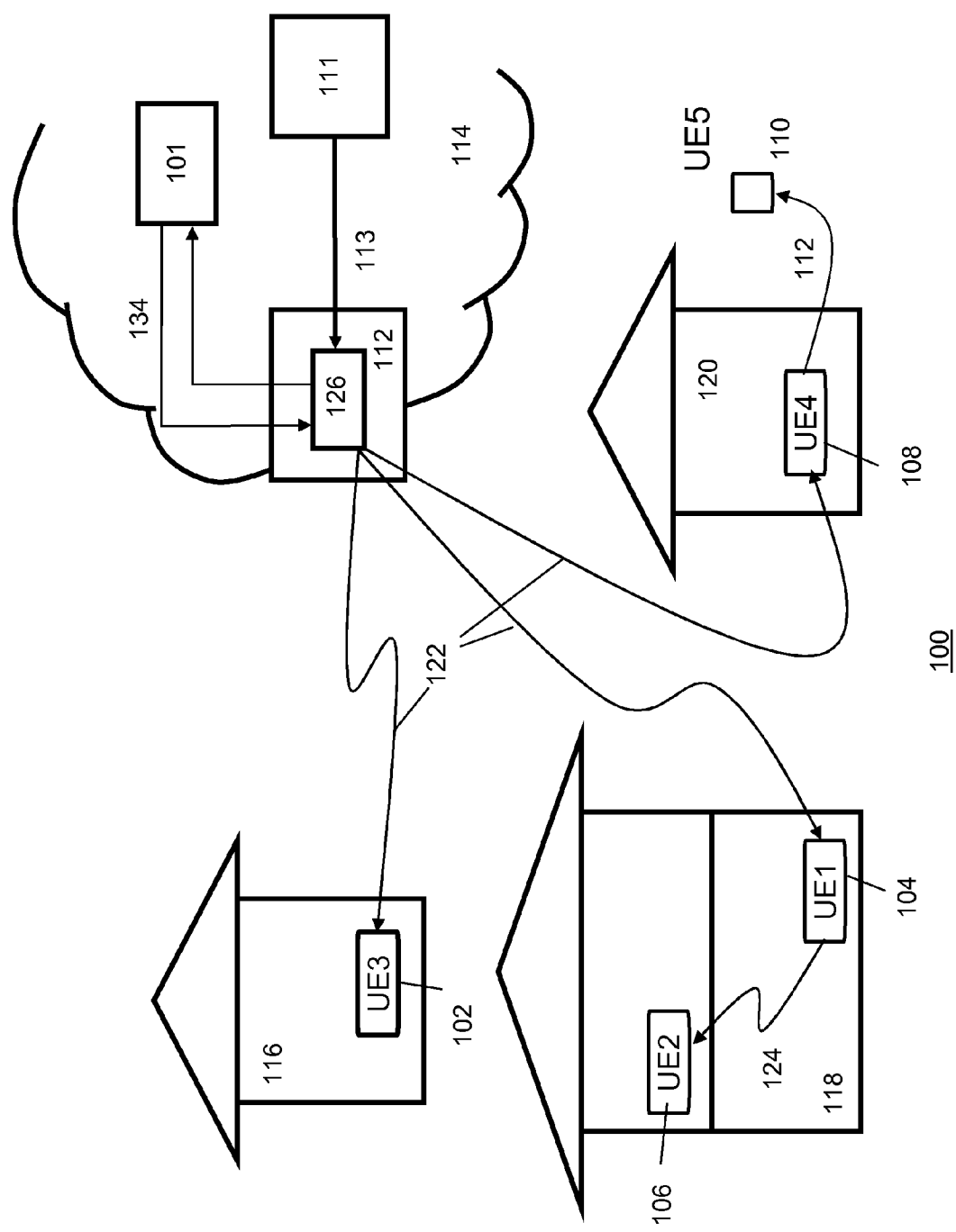
FIG. 1 depicts a schematic depicts part of a conventional content delivery system.

FIG. 1 depicts part of a conventional media delivery system 100 comprising UEs 102-110 connected via an edge (access) node 112 (e.g. a DSLAM in an xDSL system or CMTS in a DOCSIS/cable system) to a media delivery network 114. A media source 111 transmits at least one media stream 113 to the edge node. As the route between the edge node and the terminal only consists of a single network segment, i.e. the access link, in simple access configurations no much difference in delays exists between an edge node and terminals at the users' locations in a home network. Hence, if delays between the edge-node and different terminals exist, the delay is more or less the same so that the play-out of media using the different UEs connected the edge-node is more or less in sync.

The use of different multi-media equipment however may result in situations in which different delays between an edge-node and the different UEs connected thereto may exist. FIG. 1 depicts an edge-node and three residential environments (houses) 116-120, wherein the edge-node delivers media streams 122, e.g. MPEG-4 media streams, to the different UEs. The user of UE3 may use its UE 102 for direct viewing of the delivered media stream and thus no further delays exist in residential environment 116. The user of UE1 does not use its device to view the delivered media stream, but has connected a second UE2, e.g. a MPEG-2 media player, to UE1, which forwards the media stream to UE2. Before forwarding the transport stream, UE1 first transcodes the MPEG-4 media stream into a MPEG-2 media stream 124. Similarly, the user of UE4 has a further UE5 in the form of a mobile device 110 for viewing media streams. The mobile device is wirelessly connected to UE5 which transcodes the MPEG-4 media stream into a media format suitable for use with the mobile device. Hence, the use of transcoders in the access link may introduce significant delays including: delays relating to jitter buffering, to extra packetizing and depacketizing processes, to extra transport delays and transcoding delays. These extra delays, in particular the latter one, may be substantial thereby introducing unacceptable differences in the play-out of the various UEs.

These differences may not be compensated using known network-based synchronization schemes wherein a synchronization client (SC) 126, implemented in an access-node exchanges synchronization information with a synchronization server 101. In such scheme, the SC 126 comprises functionality for measuring media packet arrival times, for generating synchronization status information and for delaying the play-out of a media stream.

The synchronization server may collect the synchronization status information from the SC 126 and from other SC's comprised in other access/edge nodes (not shown in FIG. 1.), calculate delay information and send synchronization settings information 134 to the SCs, which use the information for setting a variable delay buffer such that the media play-out of the UEs connected to the two or more access/edge-nodes involved in the inter-destination synchronization scheme is substantially synchronized. Although suitable for large-scale deployment and network-control, such synchronization scheme may not compensate for delays generated in the access lines, since only differences in arrival time of a media stream arriving at different edge nodes are considered in this scheme. Any differences in delay that may build up beyond these nodes, when the mediastream continues on different paths to the respective UE's, is no longer considered. The term Access lines is used in the broad sense of the term, meaning all connections and elements between the network node containing the SC, e.g. an edge node, and the UE. This may also include parts of a home network or parts of other networks in case of media streams being redirected to other networks before arriving at the UE.

Hence, there is a need in the art for improved synchronization schemes, including improved inter-destination synchronization schemes, which provide improved synchronization performance and which provides a synchronization scheme, which is scalable to large-scale applications.

Figure 2:
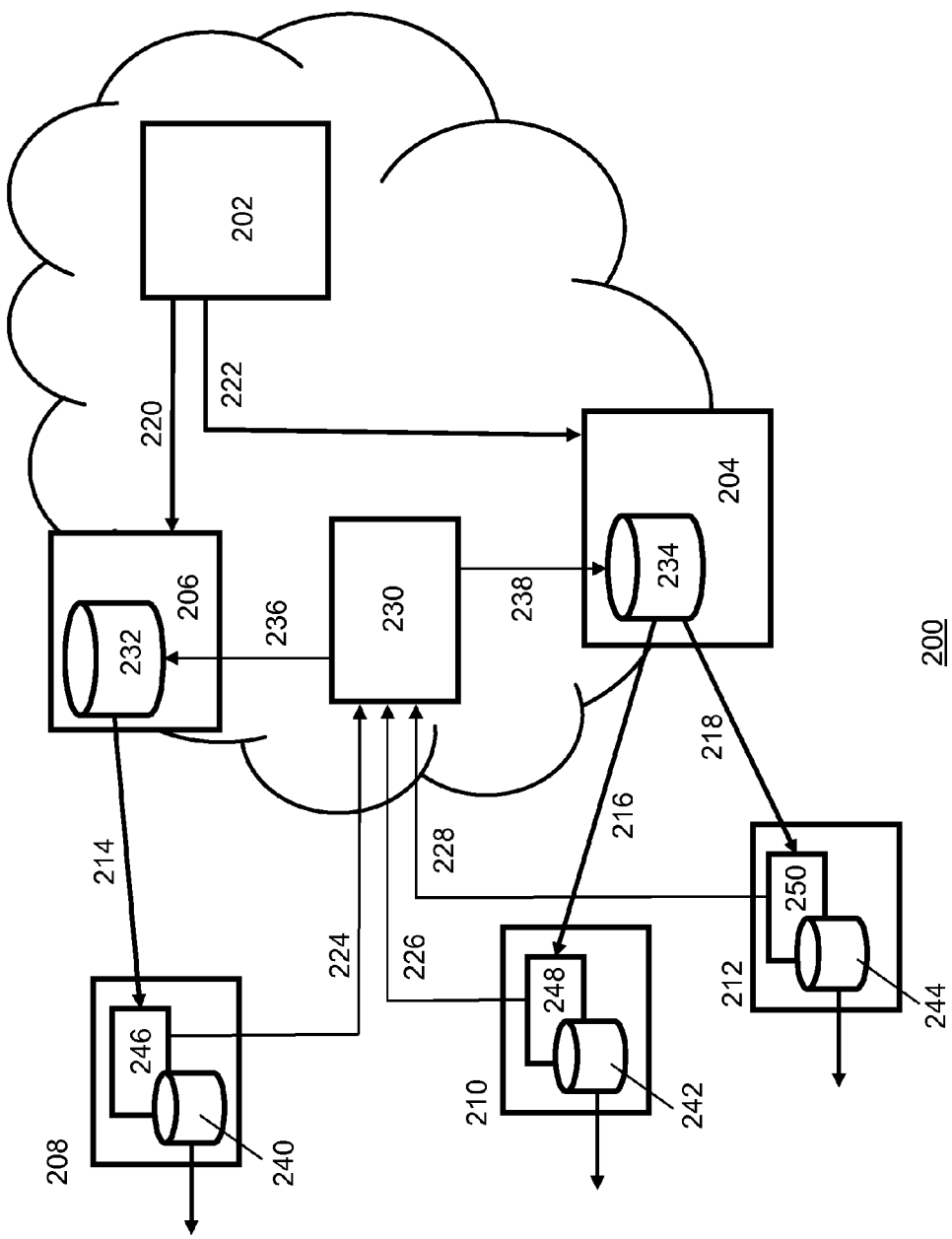
FIG. 2 depicts a schematic of at least part at least part of a content delivery system according to one embodiment of the invention.

FIG. 2 depicts at least part of a content delivery system 200 according to one embodiment of the invention. The system comprises at least one media source 202 for delivering content via one or more network nodes 204,206 to user-equipment (UEs) 208-212. The UEs are connected via an access line 214-218 to an access-node, i.e. a network node at the edge of the network. Typically, the network may relate to a packet-switched network wherein the content is transmitted in one or more media streams 220,222, e.g. a video-on-demand stream or a (live) multicast television broadcast, to the UEs. The network nodes may relate to access nodes (for example a Digital Subscriber Line Access Multiplexer (DSLAM), Cable Modem Termination System (CMTS)), an optical access node or an edge router or a head-end. Further, the UE (also referred to as a terminal) may relate to any device capable of handling a media stream, e.g. a media play-out device or a device connected to one (e.g. a set-top box). Such devices may include a mobile phone, television set, IP-phone, game console, smart metering device, etc. The term play-out may be understood as displaying or presenting (parts of) content in the stream to a user or to a further device The access lines between the UE and the edge-nodes may comprise intermediate elements (not shown), e.g. one or more transcoders and/or mixers, in a similar way as depicted in FIG. 1. As explained with reference to FIG. 1, these intermediate elements may cause different delays in each of the access lines connected to the UEs so that synchronized or at least substantially synchronized play-out of the UEs is not possible. Hence, in order to enable compensation for such undesired delays the UEs may comprise a measuring unit, e.g. a Measuring Synchronization Client (MSC) 246-250, configured to determine media packet arrival time information. This media packet arrival time information is used by the MSC to generate synchronization status information 224-228, which is sent to a synchronization server 230 (hereafter referred to as a media synchronization application server (MSAS)) in the network.

Hence, the MSC allows the UE to serve as a measuring point for measuring arrival time information of media packets and to report this information in synchronization status information to the network. The MSAS uses the synchronization status information of all UEs belonging to a synchronization group in order to calculate delay information for buffering points in the network, which are located in the media paths of the media streams which require synchronization. The MSAS may provide the buffering points with delay information such that the media play-out of the UEs is substantially synchronized.

In one embodiment, such buffering point may be implemented as a Buffering Synchronization Client (BSC) in a network node, e.g. an access-node or the like. In order to achieve synchronization, the BSC is associated with a variable delay buffer 232,234, which may be controlled by synchronization setting information 236,238 sent by the MSAS to the network nodes. The buffer associated with the BSC hereafter will be referred to as a BSC buffer. The BSC buffer is configured for handing relatively large delays, e.g. in the range between approximately 0.5 and 5 second. Moreover, the BSC buffer is network controlled in the sense that it receives its delay instructions via synchronization setting information from the MSAS and adapts its delay settings according to these instructions.

An UE may further comprise a jitter buffer 240,242,244, typically in the form of an adaptive jitter buffer, which may compensate for small-delay fluctuations, typically in the range between 20 and 50 ms up to a maximum between 100 and 200 ms. Typically, the maximum jitter that may be compensated is equal to the buffering delay (size) introduced before starting the play-out of the media stream. Such adaptive jitter buffer is configured to measure the fluctuations in the media stream (i.e. the statistical variance of the media packet arrival time) and compensates these fluctuations by dynamically adapting the length (size) of the buffer. This is in contrast with the buffer associated with the BSC buffer, which receives its delay settings from the MSAS.

In contrast with known network-controlled synchronization schemes, the synchronization scheme according to the invention uses a separate measuring point, e.g. a MSC and a separate buffering point, e.g. a BSC, wherein the measuring points and buffering points are located at different locations on the media path between a media destination (for example a UE) and a media source. As the MSC may be located somewhere in the access line or even in the UE, the synchronization scheme allows for compensation of delays in the access line. In one embodiment, the MSC may be located in the UE and the BSC may be located in an access-node. In a further embodiment, the MSC may be located in a node associated with a local network or a home network. In yet a further embodiment, the MSC may be located in the network, e.g. in an access node, and the BSC may be located in the access line or even in the UE.

Hence, the invention relies on the insight that the functionality for providing synchronization is provided by separate measuring points and buffering points. Hence, in contrast to known inter-destination synchronization schemes wherein the functions (i.e. measuring and buffering) required for synchronization were implemented together in a single logical entity. The splitting these functionalities presents a number of technical challenges to be met. The above embodiments and their associated advantages will be discussed in more detail hereunder with references to FIG. 2-12. In the detailed discussion the technical challenges are also stipulated, as well as a clear insight into solutions to resolve these.

Synchronization is based on time information in or associated with elementary media units in a media stream such as an RTP or MPEG packet or the like. Each packet that arrives at the MSC of a UE may be associated with a RTP timestamp and a NTP timestamp. The RTP timestamp reflects the sampling instant of the first octet in the RTP data packet. The initial value of the timestamp is a random value. The RTP timestamp counts sampling periods so if a second RTP packet starts 160 samples after a first RTP packet, then the second RTP time stamp is 160 higher than the first.

In contrast, the NTP timestamp is an absolute "wall clock" time. NTP is a 64-bit counter of which started 1 Jan. 1900 as defined in IETF RFC 1305. The 64-bit timestamps used by NTP consist of a 32-bit seconds part and a 32-bit fractional second part. It represents the absolute time that the first octet, identified by the RTP timestamp, passes a specific point in the UE. This specific point may be e.g. the play-out point of the UE wherein the NTP timestamp represents the time that the specified octet is played to the user. Alternatively, it may be the ingress (input) point, when the MSC first receives the specified octet.

One technical challenge to be met, when splitting up the measuring and buffer points according to the invention, relates to the existence and potential interference of network jitter with the synchronization activities. Although there is a random offset between RTP packets because of jitter, and the UE determines exact time of presentation, the RTP timestamps determine at what time, compared to the other parts of the media stream, a certain video frame or audio sample should be played. Hence, if the network, e.g. a BSC in an access-node, delays a media stream by buffering packets or speeds up a media stream by discarding media packets (is normally only possible once buffering these packets) problem arise if the UE uses the RTP timestamps in the normal way. For example, the UE may encounter problems if the BSC in the network delays packets while the RTP timestamps require play-out of a packet by the UE. Similarly, the BSC may discard packets resulting in a "gap" in the RTP timestamps, while the UE should continue play-out as if no gap is present.

Moreover, delaying a media stream somewhere in the network using e.g. a BSC, does not automatically mean that play-out of the media stream at an UE will be performed with that same delay. For example, if the delay introduced by the BSC is relatively small with regard to the frequency of the transmitted media, e.g. 100 ms, then an UE might be able to continue presentation as if no delay was introduced to the media stream at all. If the introduced delay is relatively small, the UE may perceive this as jitter and may use its jitter buffer in order to compensate the delay. If larger delays are introduced by the BSC, e.g. more than 1 second, the UE may react according to its implementation. For example, the UE may determine that a "gap" in the media stream. Because no new packets arrive, the (jitter) buffer at the UE will be emptied due to presentation of the media stream so that play-out cannot continue. Then, if new packets associated with the delayed media stream arrive at the UE, the UE may start the jitter buffering again and continue play-out of the media stream once the jitter buffer is filled to the point play-out may continue. Other UEs may not start buffering again. For example, in response to the gap in the media stream, the UE may decide the media stream is no longer available and stop play-out altogether.

In order to overcome this problem, in one embodiment, the UE may be adapted for receiving network-delayed media streams. This means that for small delays, the UE may be programmed to recognize the difference between jitter and an introduced (small) delay. Jitter represents a (statistical) variation around the transmission frequency, so even if some packets arrive later then expected, on the average media packet arrival times will remain constant. In other words, the amount of media packets in the jitter buffer may fluctuate around some stable average point. In contrast, a deliberately introduced delay has a deterministic character and will cause all further media packets to arrive later. The difference between statistical delays and a delay introduced by a network buffer may be determined by measuring a number of (delayed) media packets. If the UE determines the occurrence of network buffer delay, the UE may treat these packets differently and introduce the same delay in media presentation.

Certain UEs may contain a so-called adaptive jitter buffer. An adaptive jitter buffer can adapt to a change in the arrival of media packets. E.g. if many packets arrive too late, an adaptive jitter buffer may increase in size to compensate for this behaviour. To adjust an UE to be able to delay presentation of a media stream that is being delayed, this can be thought of as an UE containing a specific kind of adaptive jitter buffer.

For longer delays, the UE may be programmed to react in the proper manner. This means that the UE should not stop play-out if such a long delay is detected. Instead, it should simply wait longer. Such a delay may be detected when during a longer time period, e.g. 1 second or more, no media packets arrive. If after such "gap" new media packets arrive, they will be continuously played-out with the previous packets. Further, if a long delay is detected, the adaptive jitter buffer may require resetting of the buffer settings. After a long delay, the adaptive jitter buffer settings may be set too high. Hence after the long delay, the jitter buffer may introduce a delay, which is longer than required.

Once a delay is introduced, a BSC may also decrease the delay again, e.g. by skipping media packets. Such process may also introduce problems. If packets are dropped by the BSC, the UE may perceive this is packet delay or packet loss. An UE may wait to see if the packets will still arrive, instead of continuing playback with the new less delayed packets. Hence, depending on their implementation, UEs may respond differently to missing packets. This may be solved by programming the UE such that missing media packets followed by new media packets that arrive earlier then expected (on average and in the same manner as a larger delay is detected) may be interpreted by the UE that the delay has been reduced and that media play-out is directly continued with the newly arrived, less-delayed packets (instead of interpreting the missing packets as packet loss).

Another solution for dealing with the delays introduced by the BSC buffer is to make the BSC media-aware, or at least, RTP aware. A BSC may be configured to change RTP timestamps of the incoming media stream before forwarding media packets to an UE. Not every RTP packet however will comprise exactly one media packet. For audio, an RTP packet may contain multiple audio samples. In contrast for video, multiple RTP packets (with the same RTP timestamp) may contain one video frame. This depends on the size of the RTP packets and the size of the media packets, i.e. audio or video. Hence, in order to change an RTP timestamp in a RTP packet, the BSC is configured to recognize of the media an RTP packet is carrying and to change timestamps accordingly.

A change in a timestamp may be realized relatively easy. If all packets are to be delayed for a certain amount of time, the new timestamp may be calculated by subtracting the amount of time for the buffered packets. RTP timestamps increase on the basis of the clock frequency of the media stream as defined in ETSI RFC 3550. So, to be able to subtract an amount of time (in ms) from RTP timestamps, the clock frequency is needed. For many payload types the clock frequency is well-known and specified e.g. in IETF RFC 3551. The BSC may acquire the payload type used in a media stream by obtaining a clock frequency by monitoring packets in time and associating the clock frequency with a payload type. Alternatively, the payload type may be sent in a synchronization setting message from the MSAS to the BSC.

Yet a further solution for dealing with the delays introduced by the BSC buffer is that both the UE and the BSC may receive the synchronization settings instructions. These synchronization settings instructions contain instructions on the play-out time of the media stream. Even though the BSC is introducing the delay in order to achieve the inter-destination synchronization, the UE may use the synchronization settings instructions as a means to adjust its play-out. Through the information from the synchronization settings instructions the UE is aware of the fact that packets from the media stream arrive late because the BSC has delayed them. A synchronization scheme allowing the UE to receive the synchronization settings instructions is described hereunder in more detail with reference FIGS. 5 and 6.

If one or more access lines comprise intermediate elements, e.g. a forwarding UE forwarding a media stream to a UE of an end-user, the forwarding UE should be able to forward synchronization status information messages (e.g. in the form of RTCP messages) originating from the UE of the end-user to the network. Such process may be realized by the techniques as described in IETF RFC 3550, which is hereby incorporated by reference. RFC 3550 specifies two kinds of intermediate elements in a media path: a mixer and a translator. A translator may forward RTP and RTCP messages unchanged. Hence, if the forwarding UE functions like a translator, forwarding RTCP messages back and forward does not pose a problem. If, however, an UE functions as a transcoder, (e.g. transcoding the media stream to another codec), the UE should be configured to process the RTCP messages.

During transcoding, the UE modifies the RTP media packets and the RTP timestamps. Hence, in order to be able to sent RTCP message via the transcoding intermediate element to the network, it keeps track of incoming and outgoing timestamps that belong together. In other words, the transcoding UE is able to correlate time stamps of media packets at the input with time stamps of media packets at the output and vice-versa. If UE of the end-user sends a synchronization status information message, this information will contain or is based on RTP timestamps of the transcoded RTP stream. Hence, using the correlation information between the incoming and outgoing timestamps, the transcoding UE has to change the RTP timestamp to the associated value of the incoming RTP stream. This way the RTCP message sent to the MSAS contains the synchronization status information that is based on the correct RTP timestamps. This process is described in greater detail in RFC 3550.

Figure 3:
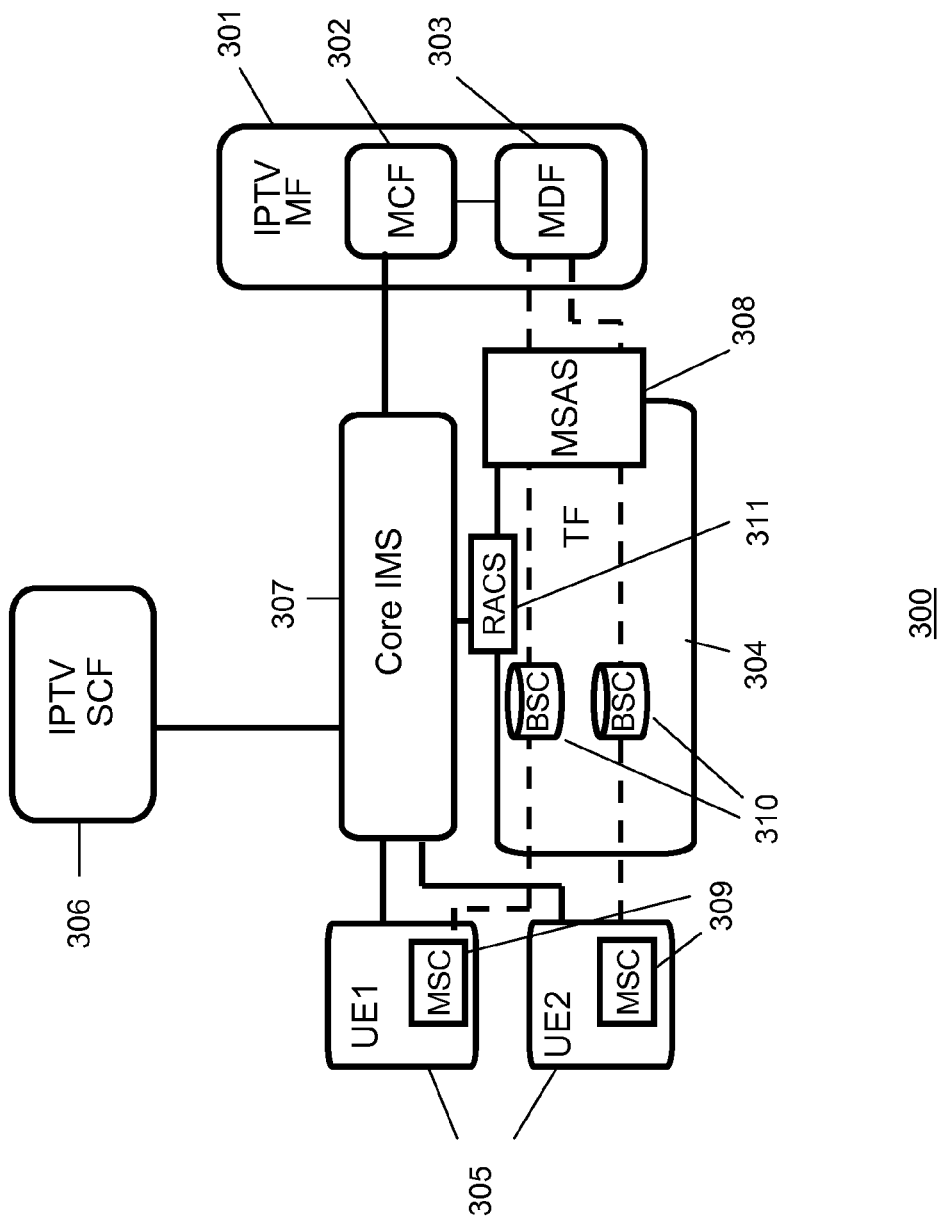
FIG. 3 depicts a schematic of at least part at least part of a content delivery system according to yet another embodiment of the invention.

FIG. 3 depicts at least a part of a content delivery system according to another embodiment of the invention. In particular, this embodiment depicts to an implementation of a content delivery system on the basis of an IMS-based IPTV 300 architecture as defined by ETSI TISPAN TS 183 063 and TS 182 027. The system comprises an IMS core 307 comprising a set of Call/Session Control Functions (CSCF): e.g. a Proxy-CSCF (P-CSCF), an Interrogating-CSCF (I-CSCF) and a Serving-CSCF (S-CSCF). The IMS core is further connected to User Equipment (UE) 305, IPTV service control functions (SCF) 306 for controlling IPTV services in the network (e.g. a broadcast SCF, a Content-on-Demand SCF, etc.) and to Media Functions (MF) 301 comprising Media Control Functions (MCF) 202 and Media Delivery Functions (MDF) 303 to control the delivery of media content and control packets via Transport Functions (TF) 304 to the User Equipment (UE).

The IPTV architecture from TS 182 027 is extended with a Media Synchronization Application Server (MSAS) 308, which is arranged to execute inter-destination synchronization functions. Inter-destination media synchronization relates to synchronization techniques enable the presentation of certain media, e.g. a video fragment and/or audio sample at different destinations at the same or at least almost the same point in time. The IMS system may be adapted for media buffering. Media buffering may e.g. take place at the Transport Functions using one or more variable delay buffers. A buffer may receive buffer setting information from the MSAS. appended to synchronization status information reports, e.g. RTCP receiver reports with synchronization extensions, which the UE sends to the network for RTP transport control.

Synchronization may be executed using synchronization status information determined by Measuring Synchronization Clients (MSC) 309 at UE locations in conjunction with buffering using e.g. at least one variable delay buffer and associated Buffering Synchronization Client (BSC) 310 in the Transport Functions. The MSAS may collect synchronization status information from different MSCs and control the buffering process in the associated BSCs by sending synchronization settings instructions. The IMS core may send the synchronization setting instructions to the BSCs in the Transport Functions using the Resource Admission and Control Subsystem (RACS) 311.

The IPTV system in FIG. 3 may use the Session Initiation Protocol (SIP) to set up and control sessions between user terminals or user terminals and applications servers comprising the SCFs and MFs. The Session Description Protocol (SDP) carried by SIP signaling messages may be used to describe and negotiate the media components in the session. Further, the Real Time Streaming Protocol (RTSP) is used for media control providing e.g. broadcast trick modes, Content-on-Demand (CoD) and Network Personal Video Recorder (NPVR) and the Real Time Transport Protocol (RTP) and the RTP Control Protocol (RTCP) are used for media transport and control thereof respectively.

Figure 4:
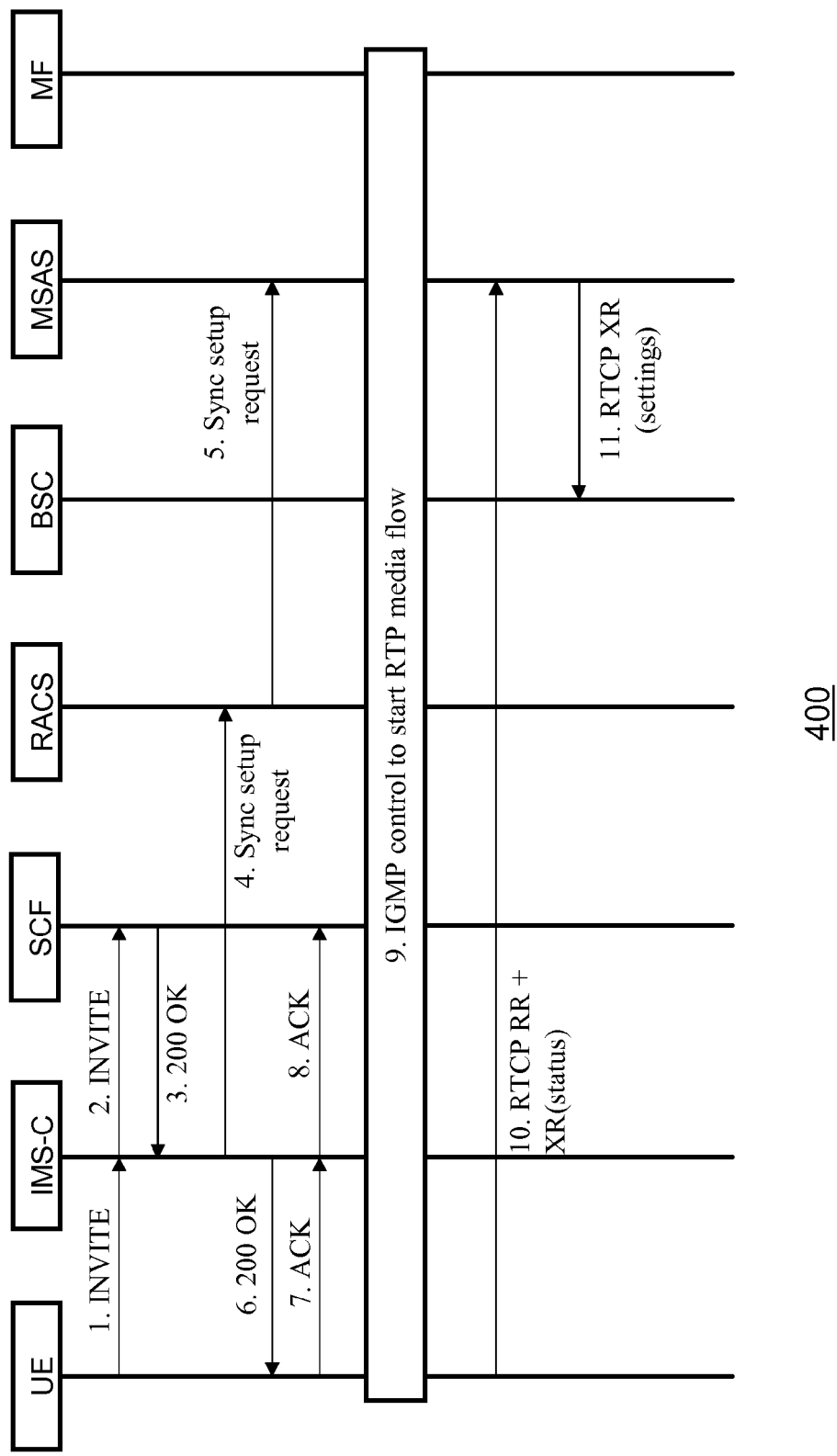
FIG. 4 depicts a signaling flow according to an embodiment of the invention.

FIG. 4 depicts a signaling flow 400 according to an embodiment of the invention wherein receivers (UE's) subscribed to an IP multicast channel are synchronized. This scenario may be applicable when for example two users would like to watch the same live content (for instance a multi-casted soccer match) in a synchronized manner on different UE's at different locations. The inter-destination synchronization may enable interaction of the users via a continuous chat session or an open telephone line, enjoying the game together, without running the risk that one user sees a goal seconds before the other does.

In a first step 402 the UE requests the IMS Core to set-up a media session. The request message may e.g. be a SIP INVITE message as specified in ETSI TS 182 027 and ETSI TS 183 063. This request may be forwarded by the IMS Core to the SCF (step 404), which delivers advanced services for basic IPTV media delivery. The SCF may reply to this request with a response message, e.g. a SIP 200 OK message, comprising further information on the session to be setup. This further information may comprise the address of the MSAS, e.g. an URL or IP address, and a group synchronization identifier, SyncGroupId, for identifying the group of terminals to be synchronized. The group synchronization identifier may e.g. be included as a SDP parameter in the response message. The IMS Core subsequently forwards the response message back to the requesting UE (steps 406, 412) and informs the RACS that the requested media session requires synchronization.

The RACS may be informed using a Diameter message as specified in ETSI TS 183 017. Diameter is an extendable protocol, which for the purpose of synchronization may be extended by defining new attribute-value pairs containing the required synchronization information. In particular, the Diameter sync setup request 408 may comprise the information for identifying the synchronization session, e.g. the SyncGroupId, information for identifying the media stream to be synchronized (e.g. one or more Session Description Protocol (SDP) parameters in the SIP response message), information for identifying the UE involved (e.g. the IP address of the UE setting up the media stream), and the address of the MSAS assigned as a synchronization server to this specific media synchronization.

Using e.g. DHCP, the network may assign an IP address to an UE. The network may assign an IP address to a UE within in a certain range of IP addresses, which may be associated with a certain network node containing a BSC. The RACS may be provided or configured with a list of IP address ranges and the address of a BSC associated with each of the IP address ranges. Using the IP address of a UE in the sync setup request message 408, the RACS may identify on the basis of the list a BSC, which is suitable for buffering media streams associated with the media session. A BSC is usable for use with an UE if it is in or associated with the media path between the media source and the UE.

After the RACS having determined the IP address of the BSC to be used as a buffer for synchronization, it may insert this address in a sync setup request, which is subsequently forwarded to the MSAS using e.g. a Diameter message 410, which may have the same or a similar format as the sync setup request 408 sent from the IMS Core to the RACS, and which may be extended with the BSC identifier, e.g. an attribute-value pair containing the BSC IP address.

The mechanism of assigning or locating the BSC is not limited to the embodiment as described above. In one embodiment, the SCF may maintain a list of UEs and BSCs. Using the list, it may assign a BSC to the media session requested by a UE and communicate the selected BSC directly to the MSAS. In another embodiment, the RACS does not inform the MSAS directly but instructs the BSC to report itself to the MSAS assigned by the SCF. In yet another embodiment, the BSC address may be communicated to the UE. The UE may subsequently communicate the address to the MSAS as part of a status information report. In this variant, the BSC address may be associated with a field in an RTCP message comprising e.g. the BSC IP address and, optionally, a port number.

Hence, the SCF or/and the RACS may be configured to assign a suitable BSC to an UE. In one embodiment, such BSC may be co-located in an edge-node, e.g. a DSLAM or CMTS. The problem of identifying, which UE(s) is (are) behind a certain edge-node (i.e. association of one or more UEs to an edge-node) may be solved in various ways. Typically, it is the edge-node connected to a UE, which supplies the IP address using DHCP to the UE. If the IP address assigned to a UE is unique, it may be used as an indicator to which edge-node it is assigned. The assignment of IP address ranges to edge-nodes in the network may be predetermined, e.g. by manual configuration, and maintained in a list stored somewhere in a database which is accessible to the network. The list may be copied to or be accessible by the SCF and/or the RACS.

Further variants for selecting a suitable BSC may be based on network topology information already available in a network. For example, many fixed networks comprise a network administration system, which keeps track of which customer is behind which access line. Similarly, for dealing e.g. with call setup and handovers, a mobile network continually keeps track of which base station is used by which terminal. Hence, in such situations the network topology information is all ready available in the network and may be used for the purpose of selecting a suitable BSC.

In another variant, the BSC may be located in a network node, which is higher in the network hierarchy, i.e. a network node through which all or at least a large part of the media streams travel. Yet another option may be determining the route between media source and UE. This may be realized by sending a trace-route message from the media source to the UE or vice-versa. A trace-route message, which is available in most operating systems and sometimes referred to as "trace-path" or "tracert", may return a list of all network nodes travelled between two entities in a network. If a list of all nodes containing BSC functionality is available, a network node containing a BSC function may be selected from the list of network nodes returned by the trace-route operation.

Now turning back to the flow in FIG. 4, in step 410 the MSAS receives the sync setup request comprising synchronization session set-up information. Synchronization session set-up information may comprise a number of information items, including:
- an identifier associated with the UE, e.g. the IP address currently used by the UE;
- an identifier associated with the BSC, e.g. the IP address and possibly port number of the BSC;
- an identifier associated with the synchronization group, e.g. SyncGroupId; and,
- an identifier associated with the content, e.g. one or more SDP parameters associated with the media stream.

One SDP parameter may relate to the port number on which the media packets are sent. The port number in combination with the IP address of the UE may be used as an identifier for the media stream. Other variants for identifying the media content may be the use of an SSRC as specified in IETF RFC 3550. The SSRC is allocated by the media source to a media stream and may be communicated to the MSAS during the media stream setup. The MSAS may store this information in a memory or a database. Further, it may correlate this information to current synchronization information in the MSAS. For example, in one embodiment, based on the SyncGroupId the MSAS may determine which other media destinations are part of the same synchronization group. This information may be used by the MSAS at a later stage for calculating delay settings.

The response message 412 as received by the UE may provide the UE with all the information needed for media setup and synchronization, including the location of the MSAS and the SyncGroupId. Optionally, it may comprise an indication that buffering is performed in another entity. After acknowledgement of the session setup (steps 414,416), the UE may use e.g. IGMP to request delivery of the selected multicast stream.

For synchronization purposes, the MSC of the UE may then send synchronization status information to the MSAS (step 418). In response, the MSAS may generate synchronization settings instructions and forward these instructions to the BSC (step 420). Transmission of synchronization status information and synchronization settings instructions may be realized using RTCP reporting techniques using e.g. extended RTCP Sender and Receiver reports, which will be described hereunder in more detail.

The synchronization status information received from the MSC may comprise a RTP timestamp and NTP timestamp for identifying a particular sample in a media stream. For example, if an RTCP Sender Report contains an RTP timestamp of 1234 and an NTP timestamp indicating February 3, 10:14:15, it means that sample 1234 in the media stream occurred exactly on February 3, 10:14:15.

The NTP timestamp thus represents the actual (absolute) time of the sampling event the UE reports on. For purposes of synchronization, it is assumed that all UEs involved in inter-destination media synchronization use clocks that are synchronized using known techniques based on e.g. NTP (Network Time Protocol). The RTP timestamp reflects the sampling instant of the first octet in the RTP data packet. The sampling instant must be derived from a clock that increments monotonically and linearly in time to allow synchronization and jitter calculations. The RTP timestamp thus provides information about the position of the sample instant in the media stream.

Synchronization may be based on various timing events, e.g. on the basis of the time the media is received by a UE or on the basis of the time the media is presented to the user. In the example it is assumed that a RTP timestamp in the synchronization status information reflects a media packet that is received at the indicated NTP time.

The MSAS will receive and administer the synchronization status information of the MSCs of the different media destinations (typically UE's) in one or more synchronization groups. On the basis of the collected synchronization status information, the MSAS may subsequently calculate the delay settings instructions for the BSCs associated with the UE's. These delay settings instructions may be determined by identifying the media destination that has the most delay and then calculating the amount of delay other media destinations need to introduce in order to match the play-out time of the identified most-delayed media destination.

The delay settings instructions relate to instructions for the BSC, allowing the BSC to process media packets in such a way to (virtually) match the given timestamp combination of RTP timestamp and NTP timestamp. The calculation of the delay setting instructions may involve selection of a reference timestamp, e.g. a NTP time stamp, and calculating for all media destinations the associated RTP timestamps.

In a first embodiment, the MSAS may for example select a certain RTP timestamp and calculate for each media destination at which NTP timestamp they should process the media packet associated with that selected RTP timestamp. In another embodiment, the MSAS may select an NTP timestamp and calculate for each media destination which RTP timestamp should be associated with that selected NTP timestamp. Note that it is not required that the MSAS selects a current NTP or RTP timestamp. It is the relation between the NTP and the RPT which matters, so current timestamps may be used or timestamps reflecting a (virtual) synchronization point in the past or in the future.

As RTP timestamps do not represent absolute time (according to IETF RFC 3550) but a frequency, the sampling rate needs to be determined. This may be done either by determining the payload type and their associated specified sampling rates (e.g. a known from IETF RFC 3551) or by using two or more Status Information Reports. For example, a first status report may contain RTP timestamp RTP_x with NTP timestamp NTP_x and a second status report RTP timestamp RTP_y with NTP timestamp NTP_y, wherein NTP_y relates to a later point in time than NTP_x. On the basis of this information the frequency (or clock rate)=(RTP_y−RTP_x)/(NTP_y−NTP_x) may be determined.

The reported media packet arrival times may contain some inaccuracies because of e.g. network jitter. These inaccuracies may be eliminated or at least reduced by using more then two Status Information Reports. If the calculated value is close to certain fixed clock rates, which are very often used (e.g. 8000 Hz, 44100 Hz and 90000 Hz), the MSAS may assume that one of these known values is used. Once the MSAS has determined the clock rate, delay settings instructions for the BSC may be calculated. Consider the following example Status Information Report values associated with UE1 and UE2 respectively, wherein a clock rate of 90000 Hz is used:

UE1 reports RTP timestamp 2070000 (RTP_UE1_reported) at NTP time 01:23:45.678 (NTP_UE1);

UE2 reports RTP timestamp 2250000 (RTP_UE2_reported) at NTP time 01:23:46.678 (NTP_UE2).

The MSAS may first determine the most delayed UE by selecting a reference timestamp and subsequent calculation of the other timestamps using the reference timestamp as a basis. For example, the MSAS may select the NTP timestamp of UE1 and calculate the RTP timestamp of UE2 at this NTP time:

$$RTP\_UE2\_\text{calculated} = RTP\_UE2\_\text{reported} + 90000 * (NTP\_UE1 - NTP\_UE2).$$

The result of this calculation is RTP_UE2_calculated=2160000, indicating that UE1 is the most delayed UE. In other words, at the time NTP_UE1, the RTP timestamp value of UE2 is larger than the one associated with UE1. Hence, in order to achieve inter-destination synchronization, UE2 has to delay play-out.

After calculating the delay settings instructions, the MSAS may send the instructions to the proper BSC. These instructions may contain for example the calculated RTP and NTP timestamps and the means to identify the media stream to be delayed, e.g. the IP address of the UE and the port number on which the media is received, or the SSRC identifier of the media stream as used in RTP protocol.

As the MSC and a BSC are located at different points in the media path, the BSC has no knowledge of the Synchronization Status Information sent by the MSC in the UE to the MSAS and no knowledge which media unit the UE is currently presenting. Hence, it cannot determine whether to introduce or remove the delay. For that reason, in one embodiment, the MSAS may include the Status Information Report originating from the MSC in the UE into the delay setting instructions so that the BSC is able to calculate the required delay on the basis of the RTP and NTP timestamps as determined by the MSAS. Hence, delay settings instructions for UE1 and UE2 may comprise the values from the Status Information Report of UE1 and the RTP_UE2_calculated value, allowing UE1 to determine to that no delay is required and UE2 to determine that a delay of one second (2160000−2070000=90000, which equals exactly 1 second given the clock rate) should be introduced.

Once the BSC has received the instructions, it may locate the proper stream based on the stream identification means and calculate the amount of delay to introduce or remove, based on the instructions. Thereafter the BSC may introduce the delay required. A delay may be realized by stop sending media packets for some time or by changing RTP timestamps in both RTP packets and RTCP packets.

The delay settings instructions may comprise NTP or RTP timestamps from the past. The receiver of the delay settings instructions, e.g. the BSC, should introduce a delay in the media stream such that the given NTP and RTP timestamp match. Even if the instruction contains an RTP timestamp of which the packet is all ready handled, the receiver of the instructions should translate the instructions to its currently handled timestamps. NTP and RTP timestamps may also be associated with media packets that will never arrive at the receiver. In a sense such timestamps may be regarded as virtual. It is the combination of NTP and RTP timestamps that dictates the synchronization. The MSAS informs the UE to act as if the UE would have been, or should be, or could be, at that RTP timestamp at that NTP time.

Since the synchronization status information as determined by the MSC and sent to the MSAS may be based on (or associated with) different packet processing times (e.g. packet arrival time, packet presentation time or packet decoding time), the delay setting instructions should—in principle—be based on the same packet processing time; e.g. if the synchronization status information is based on packet arrival times than the delay settings instructions should also be on packet arrival times. If the time difference between different processing points (arrival, decoding, presentation) is constant and known, the status reports may be based on packet arrival times while settings instructions may be based on packet presentation times.

Instead of NTP and RTP timestamps, the delay setting instructions sent to the BSC may comprise—in another embodiment—instruction for the BSC to buffer the second media stream an extra 1000 milliseconds. Alternatively, the delay setting instructions may instruct the BSC to increase the inter-destination synchronization buffer size such that a 1000 milliseconds of delay is realized. In these cases, it is the MSAS calculating the required delay.

Figure 5:
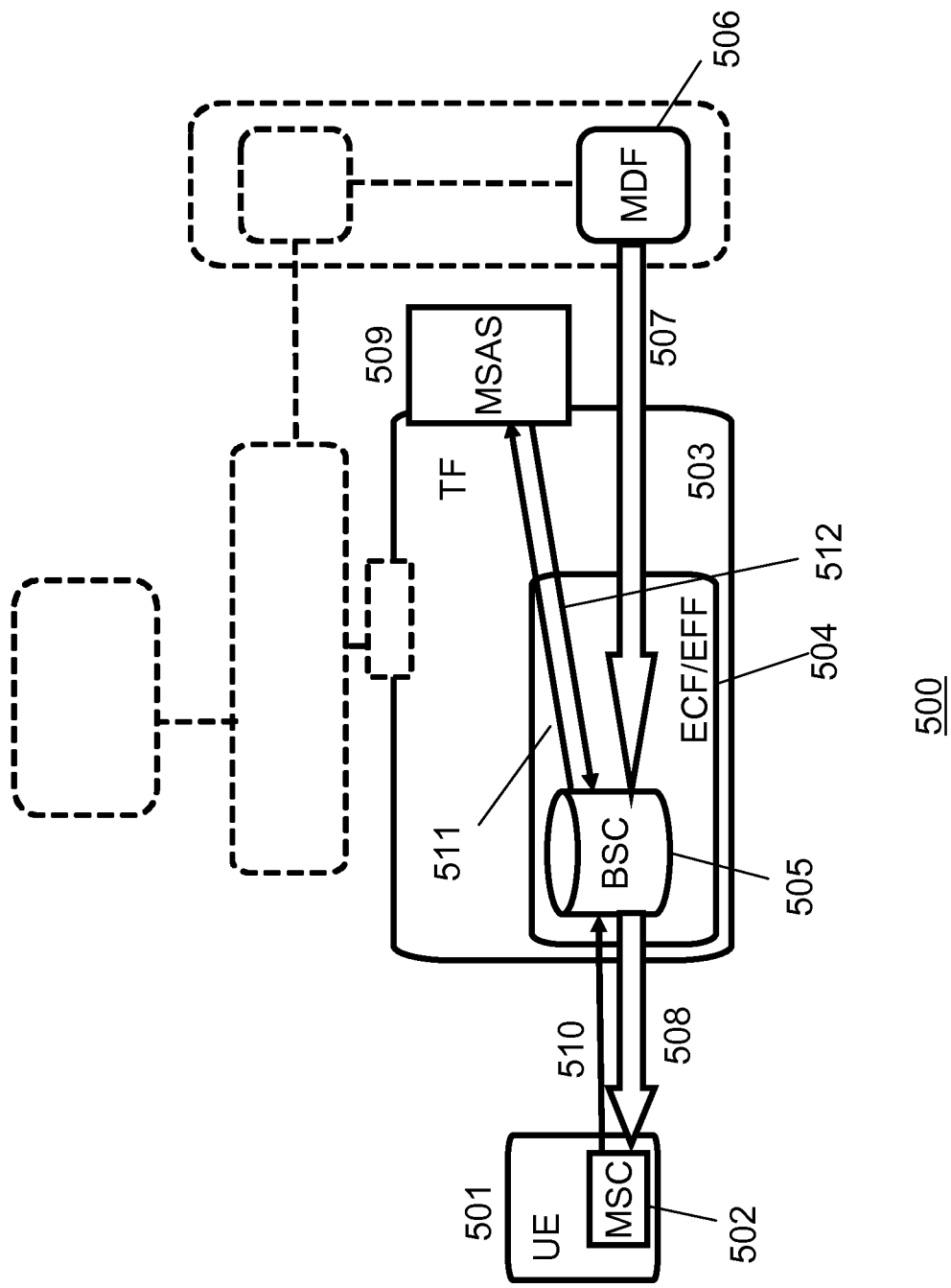
FIG. 5 depicts a schematic of at least part at least part of a content delivery system according to a further embodiment of the invention.

FIG. 5 depicts at least a part of a content delivery system 500 according to yet another embodiment of the invention. In particular, FIG. 5 depicts part of an IMS-based IPTV architecture similar to the one described with reference to FIG. 2. The system comprises Transport Functions 502 comprising Elementary Processing Functions and Elementary Forwarding Functions ECF/EFF 504 and a BSC 506 which is co-located with (or part of) the ECF/EFF. An MDF 508 delivers a media stream 510 to UE 512 as destination. The media stream is transported through TF 502, via the BSC 506 to the MSC 514 in the UE.

In response to the reception of the media stream 510, the MSC of UE generates synchronization status information messages 516, i.e. synchronization status information reports, to the MSAS 518. In contrast with the system as described with reference to FIGS. 3 and 4, the synchronization status information messages are sent to the MSAS via the BSC 506. Based on the received synchronization status information the MSAS subsequently calculates synchronization settings instructions 518 and sends these instructions via the BSC to the UE. However, instead of forwarding these messages to the UE, the BSC intercepts these synchronization setting instructions and does not forward them to the UE. In this example, both the UE, the MDF and the MSAS are not aware of the role the BSC is playing. Because the BSC is in the path of both the media stream and all the synchronization messages, it may intercept, monitor and/or adjust these messages and the media stream.

Figure 6:
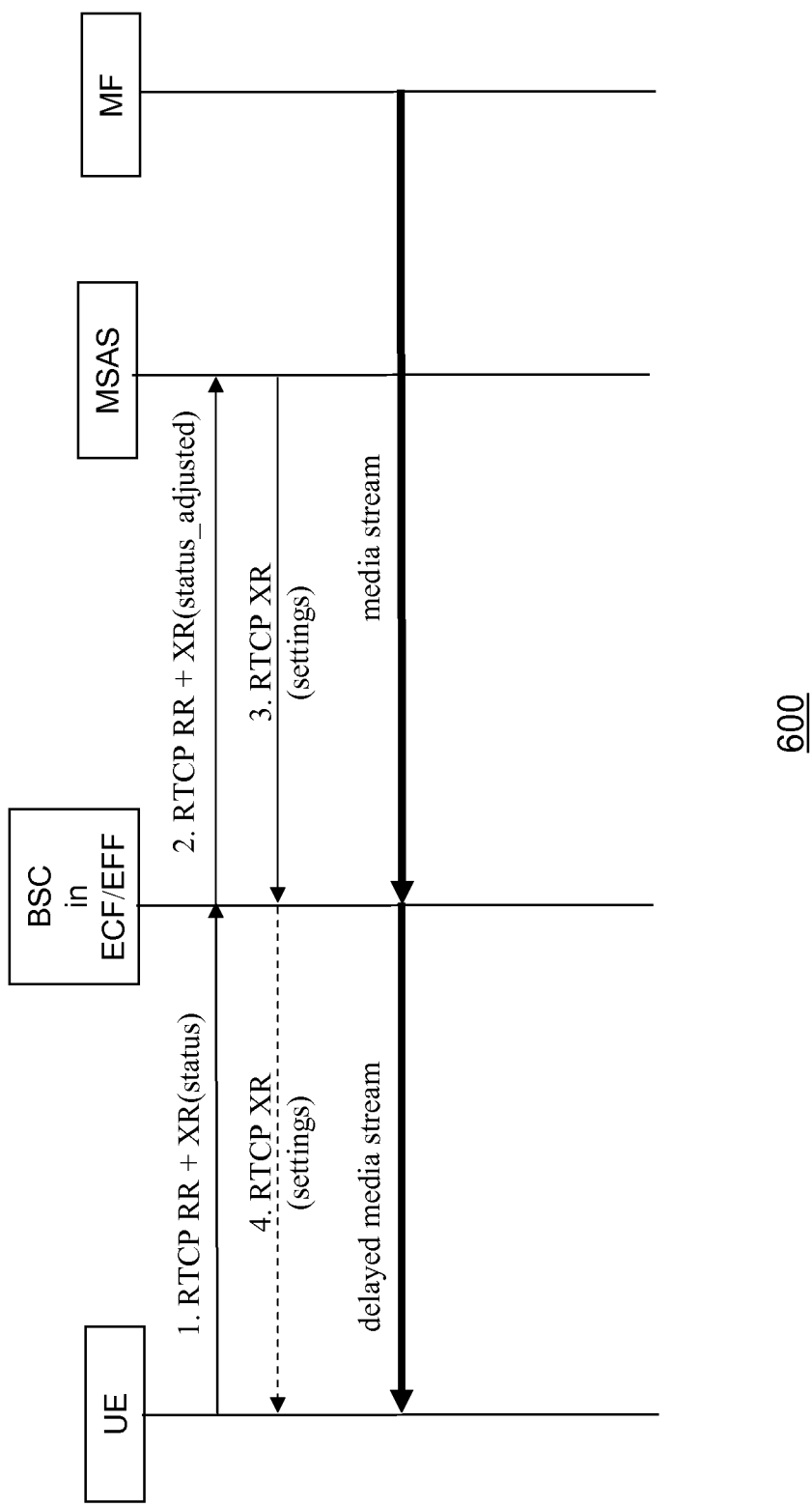
FIG. 6 depicts a signaling flow diagram according to another embodiment of the invention.

FIG. 6 depicts a message flow 600 associated with the system as described with reference to FIG. 5. In particular, FIG. 6 depicts a message flow for the synchronization messages and the media stream delivered from the MDF to the UE. In a first step 602 the UE sends a synchronization status information report to the MSAS. This report may have the form of an RTCP Receiver Report extended with an RTCP eXtended report block containing the status information. Before this report is forwarded to the MSAS, the message is intercepted by the ECF/EFF.

The message is intercepted by the ECF/EFF for two reasons. The first reason is that in order to perform any buffering by the BSC in ECF/EFF, the BSC may use the information in the synchronization status information report, for example the timing information on the packet arrival time of certain media stream packets in the MSC. If the BSC wants to know by how much it should delay the media stream, it may receive and/or determine this information in several way.

In a first variant, the MSAS may send absolute instructions, e.g. in the form of "delay media stream x for y second". The BSC may execute these instructions without any knowledge from the synchronization status report originating from the UE. In other variants, the MSAS may send instructions in the form of "play out the media if these media packets have arrived at a specified time". In that case, the BSC may carry out these instructions if it is aware of the packet arrival time at the UE (e.g. as contained in the synchronization status report originating from the UE. By intercepting the synchronization status information messages which are sent from the UE to the MSAS, the BSC becomes aware of the information in these messages, including the arrival time information. The BSC may store this information temporarily in order to use it in combination with the information contained in the synchronization settings instructions sent from the MSAS to the UE. That way, using the status information and the settings instructions, the BSC may determine if and how much it should delay the media stream.

A second reason for intercepting the synchronization status information messages is that it allows the BSC to adjust the information in the message. Adjustment of the information is required as the MSC and the BSC are located at different points on the media path. In the situation wherein the MSC is located in the UE, a delay in the media stream introduced by the BSC will result in a delay of the arrival time information. If the MSC and the BSC are located together in one synchronization client, such situation does not occur. Any delay is introduced once the packets have arrived, i.e. after determining the media packet arrival time. Hence, because the media stream is delayed before it arrives at the MSC, the synchronization status information messages would contain different timing information when compared to the situation wherein the BSC and MSC are combined in one location. To correct for this effect, the BSC may adjust the synchronization status information messages sent from UE to MSAS. The BSC knows by what amount of time it delays the media stream, so it may subtract this value from the arrival time that is reported in the status information report. If the BSC does not perform this action, the UE appears to receive media packets much later than in the situation where the BSC does not delay the media stream, or in a situation where the BSC delays the stream less than what it does at a certain point in time. Hence, when the BSC does introduce a delay, it may adjust the status information messages to reflect that.

After interception and adjustment of the information in the report, the BSC may send the synchronization status information to the MSAS (step 604), which in response may send synchronization settings instructions back to the UE (step 606). Again, the BSC may intercept these synchronization settings instructions and delay the media stream by the amount of time as derived from the status information and the settings instructions. The BSC may either forward the synchronization messages to the UE or it may not do so. This is indicated by the dashed arrow in step 608. Since the BSC executes the setting instructions, the UE does not require them to delay the media presentation. Nevertheless, besides executing the setting instructions, the BSC may also forward the instructions to the UE, which may use the information in these instructions in order to process media packets, e.g. present them at the proper time.

Figure 7:
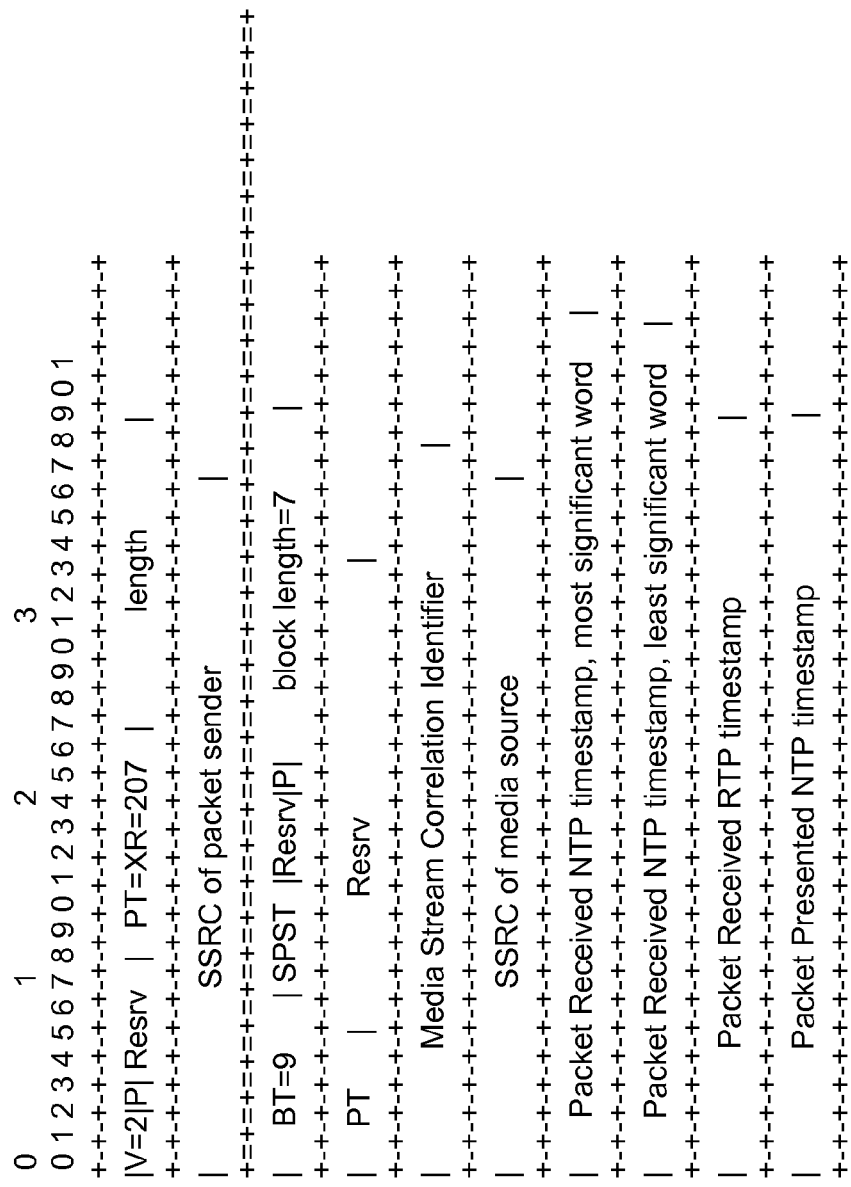
FIG. 7 depicts a synchronization information report according to one embodiment of the invention.

FIG. 7 illustrates an example of a possible RTCP XR Block Type for reporting inter-destination media synchronization information associated with a RTP media stream. Its definition is based on IETF RFC 3611. The RTCP XR is used to report information on receipt times and presentation times of RTP packets to e.g. a Sender as defined in IETF RFC 3550, a Feedback Target as defined in IETF draft-ietf-avt-rtcpssm-19 or a Third Party Monitor as defined in IETF RFC 3550. The RTCP XR may also be used for exchanging synchronization status information and synchronization settings instructions between the various elements, in particular the MSC, the BSC and the MSAS, involved in synchronizing media play-out as e.g. depicted in the message flows of FIGS. 3 and 6.

The first 64 bits form the header of the RTCP XR, as defined in IETF RFC 3611. The inter-destination synchronization RTCP XR may comprise one or more of the following fields:

The SSRC of packet sender identifies the sender of the specific RTCP packet.

Block Type (BT): 8 bits. It identifies the block format.

Synchronisation Packet Sender Type (SPST): 4 bits. This field indentifies the role of the packet sender for this specific eXtended Report. It can have the following values:
  1. SC: the packet sender uses this XR to report synchronisation status information. Timestamps relate to the SC input; MSAS: the packet sender uses this XR to report synchronisation settings instructions. Timestamps relate to the input of a virtual SC, which acts as reference to which the SCs connected to this MSAS are synchronized.

Reserved bits (Resrv): 3 bits.

Packet Presented NTP timestamp flag (P): 1 bit. Bit set to 1 if the Packet Presented NTP timestamp contains a value, 0 if it is empty. If this flag is set to zero, then the Packet Presented NTP timestamp shall not be inspected.

Block Length: 16 bits. This shall be set to 7, as this RTCP Block Type has a fixed length.

Payload Type (PT): 7 bits. This field identifies the format of the media payload, according to IETF RFC 3551. The media payload is associated with an RTP timestamp clock rate. This clock rate provides the time base for the RTP timestamp counter.

Reserved bits (Resrv): 25 bits.

Media Stream Correlation Identifier: 32 bits. This identifier is used to correlate synchronized media streams. The value 0 (all bits are set "0") indicates that this field is empty. The value 2^32−1 (all bits are set "1") is reserved for future use. If the RTCP Packet Sender is an SC or an MSAS (SPST=1 or SPST=2), then the Media Stream Correlation Identifier maps on the SyncGroupId.

SSRC: 32 bits. The SSRC of the media source shall be set to the value of the SSRC identifier carried in the RTP header of the RTP packet to which the XR relates.

Packet Received NTP timestamp: 64 bits. This NTP timestamp is the arrival wallclock time of the first octet of the RTP packet to which the XR relates. For SPST=2 it relates to a virtual SC to which the other SCs in the synchronization group may synchronize.

Packet Received RTP timestamp: 32 bits. This timestamp has the value of the RTP time stamp carried in the RTP header of the RTP packet to which the XR relates.

Packet Presented NTP timestamp: 32 bits. This timestamp reflects the NTP time when the data contained in the first octet of the associated RTP packet is presented to the user. It consists of the least significant 16 bits of the NTP seconds part and the most significant 16 bits of the NTP fractional second part. If this field is empty, then it shall be set to 0 and the Packet Presented NTP timestamp flag (P) shall be set to 0.

Figure 8:
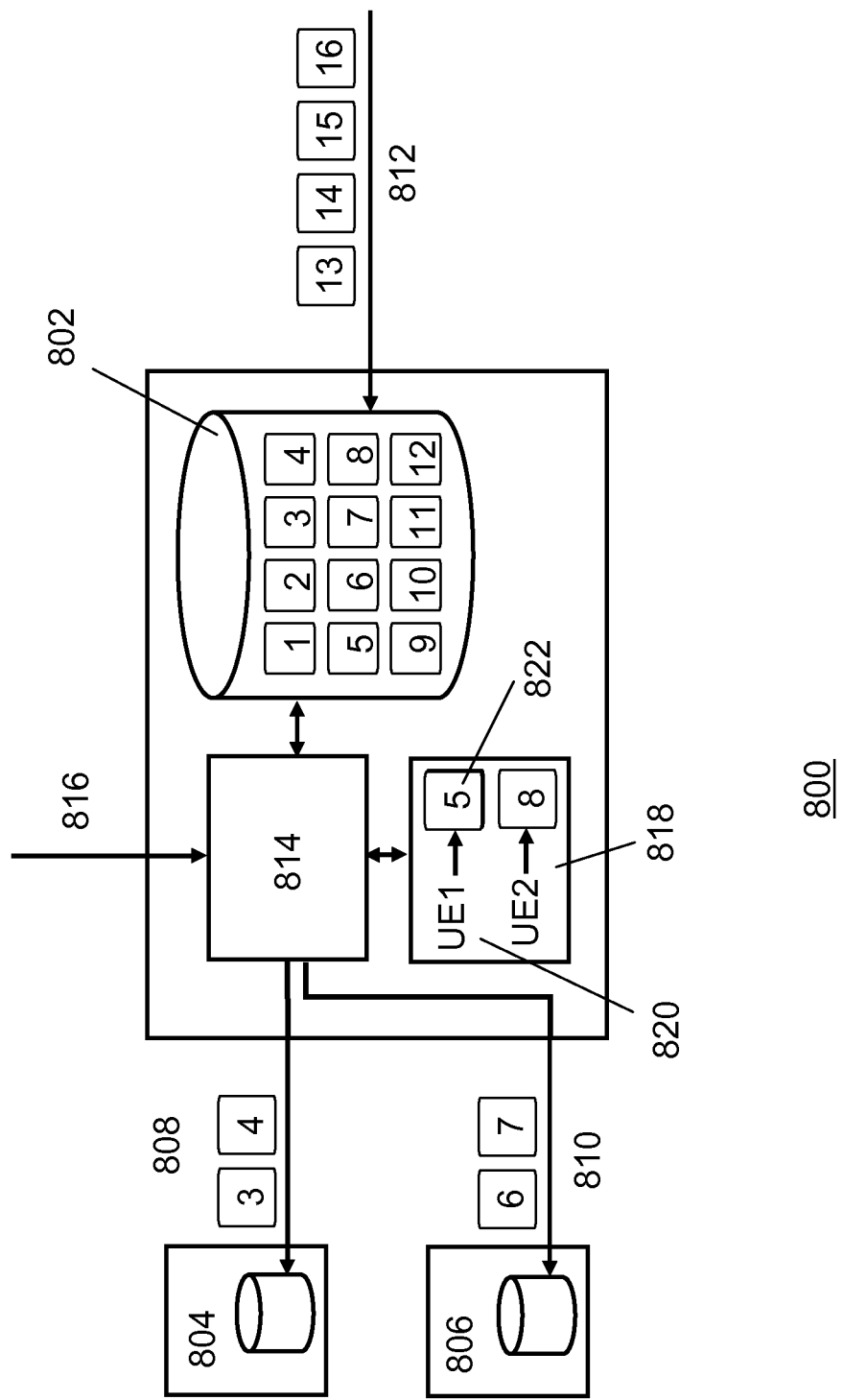
FIG. 8 depicts a schematic of buffering synchronization client according to one embodiment of the invention.

FIG. 8 depicts a BSC 800 according to one embodiment of the invention. In particular, it illustrates a BSC 800 comprising a buffer 802, which is shared by a first UE1 804 and second UE2 806. UE1 receives a first synchronized media stream 808 and UE2 receives a second synchronized media stream 810. In this example, media streams 808 and 810 are identical streams originating from an incoming media stream 812 and relating to the same content with the exception that specific packets in the first media stream are sent earlier to UE1 than to UE2. The BSC further comprises a controller 814 for controlling the processes in the BSC. For example, the controller may receive synchronization setting information 816 from the MSAS, calculate the delay associated with the different UEs in the synchronization group and transmit one or more delayed media streams to the UEs.

As UE1 and UE2 are in a synchronized viewing session with each other (i.e. they belong to the same synchronization group) and the network delay associated with the media path between the BSC and UE1 is larger than the network delay associated with the media path between the BSC and UE2, the BSC introduces a delay in order to compensate for delays in the access lines between the UEs and the access-node comprising the BSC. Hence, specific media packets, e.g. video frames or audio samples, have to be sent earlier to UE1 to enable UE1 and UE2 to receive the media stream in a substantially synchronized way. depicted in FIG. 8 is shared between two UEs. UEs viewing the same content, using the same BSC and/or belonging to one synchronization group may share a buffer. In another embodiment, a BSC may perform buffering of the same content for different synchronization groups. In both cases, it is more efficient to use a single buffer in terms of buffer capacity and incoming network load to the BSC. The buffer may work according to a First-In-First-Out (FIFO) schedule. New packets received from the originating media stream 812 are added to the buffer 802 and the packets longest in the buffer are removed first. The buffer may be shared with multiple UEs by maintaining a buffer list 818 comprising UE identifiers 820 and associated pointers 822 wherein each UE-ID identifies a UE which shares the BSC and wherein a pointer points to the next packet to be sent to its corresponding UE. For example, the buffer list 818 may comprise a first pointer associated with UE1, pointing to packet 5 in the buffer and a second pointer associated with UE2, pointing to packet 8 in the buffer. Each time a packet is sent to a specific UE, the BSC will need to maintain and update the list, in particular the pointers therein. The BSC does not have to buffer each media stream continuously. For example, the BSC may only buffer a media stream for 15 seconds to enable the BSC to deal with varying delays associated with different UEs.

Figure 9A:
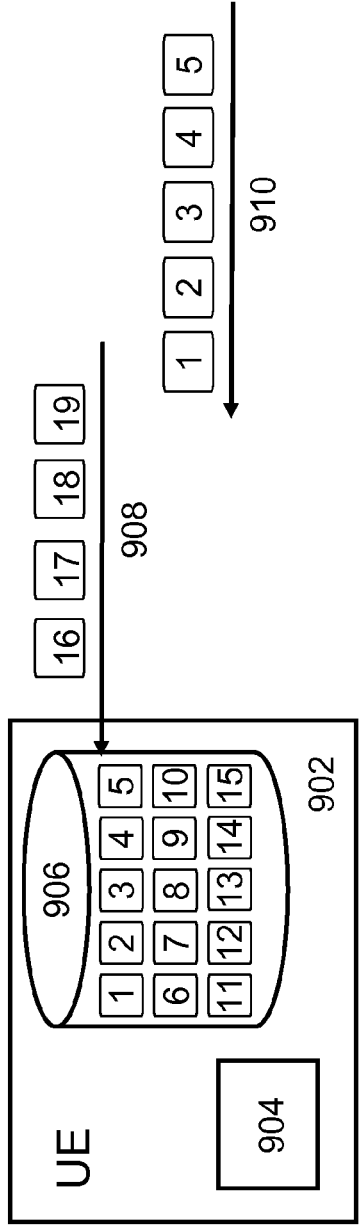
FIG. 9 depicts a schematic of a process of changing channels using a synchronization scheme according to an embodiment of the invention.
Figure 9B:
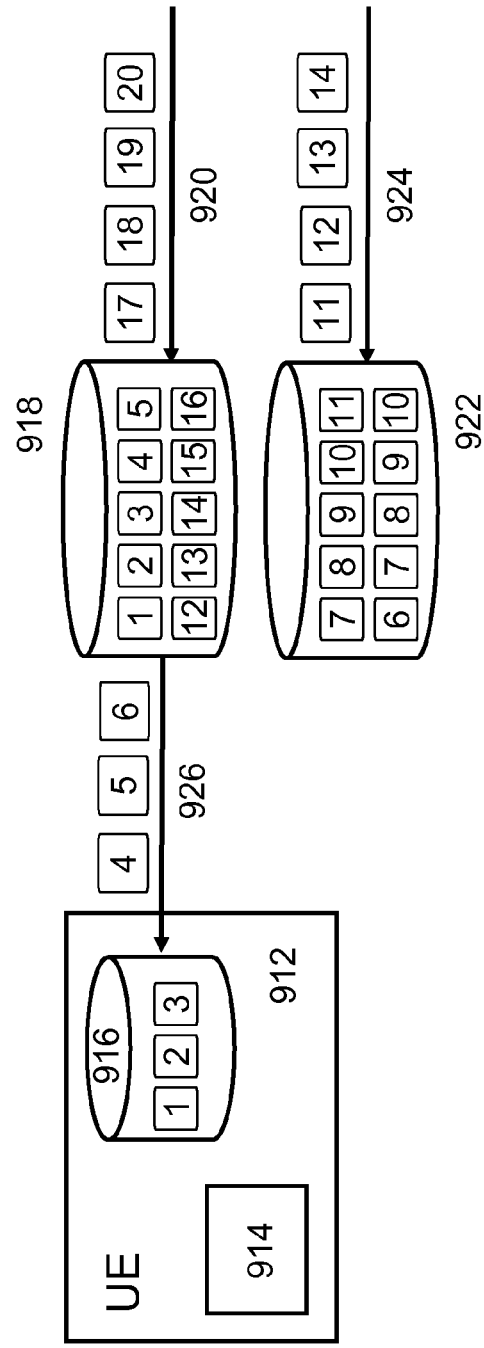

FIGS. 9A and 9B depicts schematics of buffering schemes for the purpose of inter-destination synchronization. These figures may illustrate further advantages associated with the invention, in particular advantages related to the effect of improved channel changing times. FIG. 9A depicts system wherein the UE 902 comprises a synchronization client comprising a measuring function 904 and buffering function 906. In such a case, the buffer function may be configured to function both as an inter-destination buffer and a jitter buffer. UE receives a first media stream 908 containing the video frames to be displayed to the user of UE 902. UE 902 may be part of an inter-destination synchronization session. Hence, in order to enable synchronization, UE 902 may need to perform buffering of received media in the buffering function, in this case 10 media units e.g. video frames. Because the buffer function also functions as a jitter buffer, an additional number of frames e.g. 5 video frames, is buffered thereby buffering a total of 15 video frames in the buffer function.

At some point, the user of UE may need to switch from the first media stream 908 to a second media stream 910. During a channel change, the UE may first need to start buffering the media units from the second stream 910. Without inter-destination synchronization, only a short period needs to be buffered for the purpose of dealing with jitter. However, as the buffer function in the UE is also buffering for the purpose of inter-destination synchronization, additional buffering of video frames is required before it may start displaying the buffered video frames to the user.

For example, in case the media units relate to a video stream with a 25 frames per second frame rate, only 5 frames needs to be buffered for jitter buffering purposes. This would lead to a delay of approximately 200 ms. Such a delay may still be an acceptable time for changing a channel. The BSC in FIG. 9A however requires buffering of 15 frames for dealing both with jitter and inter-destination synchronization. Such buffering would cause a delay of 600 ms, i.e. a tripling of the delay compared to for the situation, which only deals with jitter. Such increase in channel changing times could degrade the user experience.

FIG. 9B relates to a scheme wherein a MSC and a BSC are located in different points (i.e. positions) on the media path between the UE and the media source. In this case UE 912 contains an MSC 914 and a jitter buffer 916. A first BSC1 918 is located in the network somewhere in the media path between media source and UE. BSC1 918 may be buffering for the current first channel: the first stream 920 comprising the first channel is buffered for 10 media units (e.g. video frames) before to the frames are forwarded to the UE 912. The network further comprises a second BSC 922 that buffers a second media stream 924 comprising a second channel.

When compared with the scheme in FIG. 9A, the scheme in FIG. 9B provides several advantages. First, the size of the jitter buffer—in this example three media units—may reduced because of the shorter media path between the BSC and the UE. Jitter is introduced in the network, hence the longer (shorter) the network route, the larger (smaller) the delay difference between the packets in a media stream may become.

In the example of FIG. 9B, a first BSC1 may sent out the media units in a media stream 926 with regular intervals (i.e. substantially free from any jitter). A shorter media path leads to less jitter, and thus a smaller jitter buffer is required. Using a frame rate of 25 frames per second, would lead to a delay of 120 ms instead of a delay of 200 ms associated with buffering 5 frames required in the scheme depicted in FIG. 9A.

Secondly, the channel change time is shorter because the UE does not have to buffer for inter-destination synchronization purposes. Instead, a node in the network containing the BSC1 takes care of the buffering of the 10 frames required for inter-destination synchronization. As the second media stream was already buffered by a second BSC2 912, media play-out may start immediately. At a frame rate of 25 frames per second, this may save an additional 400 ms of delay during a channel change. Hence, the total channel changing delay may be decreased to 120 ms thereby providing a significant reduction in channel changing time when compared to the delay of 600 ms in the example of FIG. 9A.

One of the problems relating to zapping is determining the buffer size for the new channel for purposes of inter-destination synchronization. The simplest solution would be to delay the new channel similarly to the old channel, e.g. the same amount of time or the same amount of video frames. However more precise methods for determining the delay of the new channel may also be possible.

In one embodiment, a BSC may store a history of certain status information associated with different media streams and may use this history in order to determine precise synchronization settings instructions. For example, on the basis of on status information reports associated with media stream A, the MSAS may send settings instructions to the BSC to delay the stream for the UE and this sync group for x ms. When the UE switches to media stream B, first the BSC delays media stream B for the same amount of ms as used for media stream A. However, if new status information reports from UE are received by the MSAS, it may calculate and send new synchronization settings instructions to the BSC, now telling it to delay stream B to the UE for y milliseconds. As the only thing that has changed is the media stream, the difference between y and x may be used by other terminals for switching between these media streams. If enough channel changes occur for UEs using the BSC, the BSC may construct a channel-switching list comprising the relative delays for the various channels which may be used in order to select a suitable delay for any UE switching from one channel to another.

Figure 10:
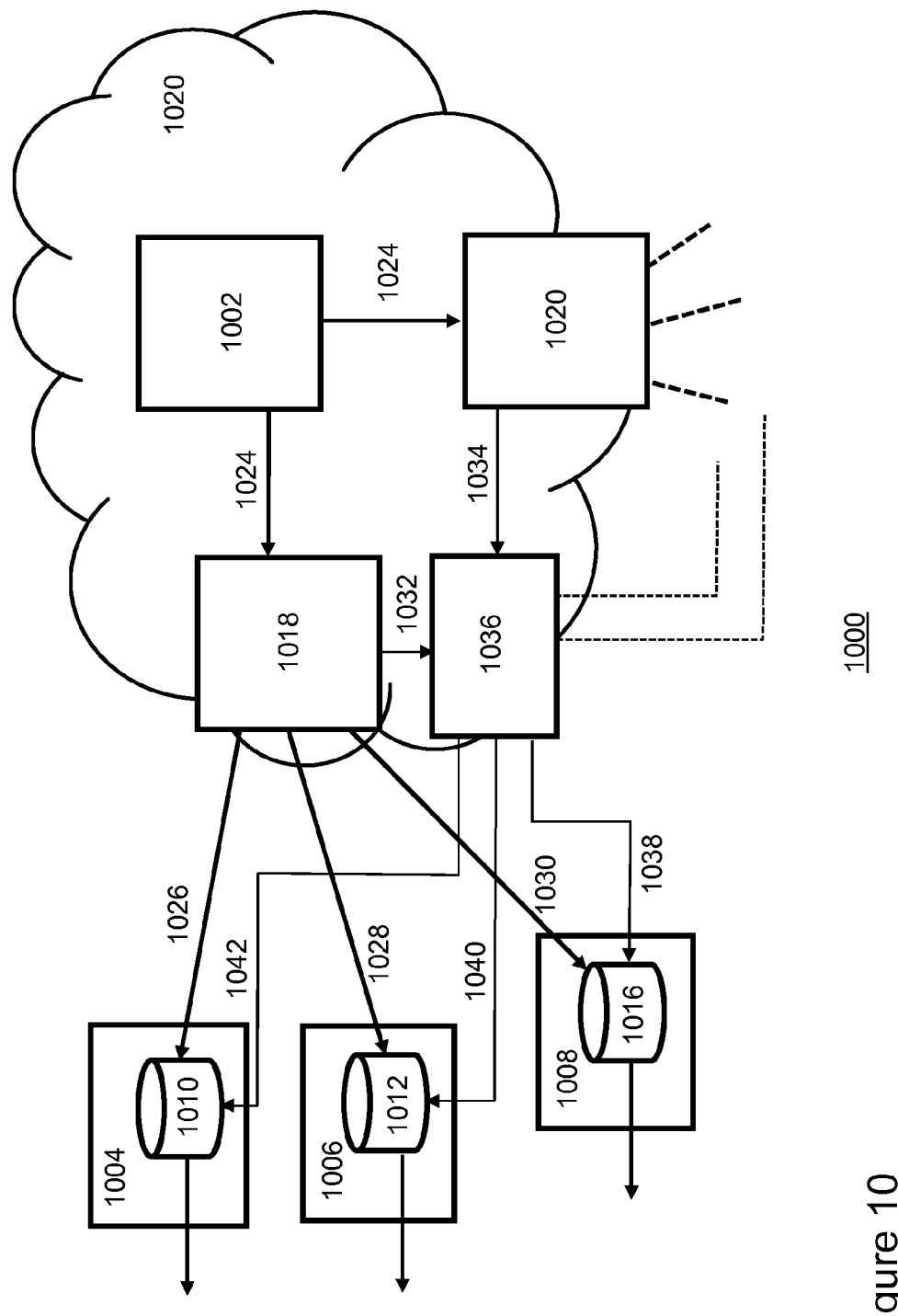
FIG. 10 depicts a schematic of at least part at least part of a content delivery system according to yet further embodiment of the invention.

FIG. 10 depicts at least part of a content delivery system 1000 according to further embodiment of the invention. In this embodiment, the system comprises a media source 1002 for delivering a media stream via one or more network nodes to a number of UEs. In order to allow synchronized play-out of the media stream by the UEs, a synchronization scheme is implemented wherein each UE 1004-1008 comprises a BSC 1010-1016 and wherein MSCs 1018,1020 is located in the network 1022 somewhere on the media path between the media source and each UE.

The MSCs receive a media stream 1024 from the media source and forwards this stream as media streams 1026-1030 to the UEs. In this example the media stream 1024 may be distributed as multicast stream, wherein the multi-casted media stream is split into three media streams 1026-1030 at a multicast hop. The MSCs 1018,1020 may be placed at the point where the multicast stream has to be split for delivery to the different UEs, such point may be an edge node of the network such as a DSLAM in an xDSL network or a CMTS in a cable network.

The use of MSCs in the network and BSCs in the UEs will mostly perform correctly if there are no large delay differences between the transport of the media from the MSC locations to the different UEs that receive the media traffic transmitted through that particular MSC. If large differences do exist, e.g. as shown in FIG. 1, such scenario will perform less then optimal for the purpose of inter-destination synchronization.

The MSCs 1018,1020 may perform media unit arrival time measurement and report these measured arrival time information as synchronization status information 1032,1034 to the synchronization server (MSAS) 1036. The MSAS may collect all synchronization status information from all MSCs concerning media streams and UEs that have a need for inter-destination synchronization. It will then calculate proper synchronization settings instructions and sent these instructions 1038-1042 to the different UEs each comprising an BSC. Note that this is not so useful if all UEs involved in inter-destination synchronization are behind a single MSC in the network.

The synchronization scheme as depicted in FIG. 10 has two distinct advantages. The first advantage relates to the fact that the scheme requires fewer messages travelling the network for inter-destination synchronization purposes. In the case where UEs both comprise a MSC and a BSC (see e.g. FIG. 9A) all UEs send their own synchronization status information messages to the synchronization server. In the embodiment depicted in FIG. 10 one MSC in the network may send one status information message on behalf of multiple UEs, thereby significantly reducing the number of messages. All UEs will still receive their own synchronization settings instructions, but typically the number of status information messages will be larger or at least equal to the number of settings instruction messages.

UEs may regularly send status information messages to the MSAS, so that it may keep track of possible lack synchronization that occurs after initial synchronization. However, once the inter-destination synchronization has been realized at some point in time and network delays are rather static so that the media delivery remains substantially synchronized, no further settings instructions are necessary because no changes in delay need to be made by the BSCs. Hence, reducing the number of status information messages by locating the MSC in the network, may provide a reduction in the larger part of the messages involved in inter-destination synchronization.

The second advantage associated with the synchronization scheme in FIG. 10 is that it reduces the amount of processing performed by the synchronization server (MSAS). An MSAS will have to process all synchronization status information messages for a certain inter-destination synchronization group, to be able to calculate the associate delay settings instructions. Fewer status information messages will lead to less complex calculations, and thus less processing needed.

Figure 11:
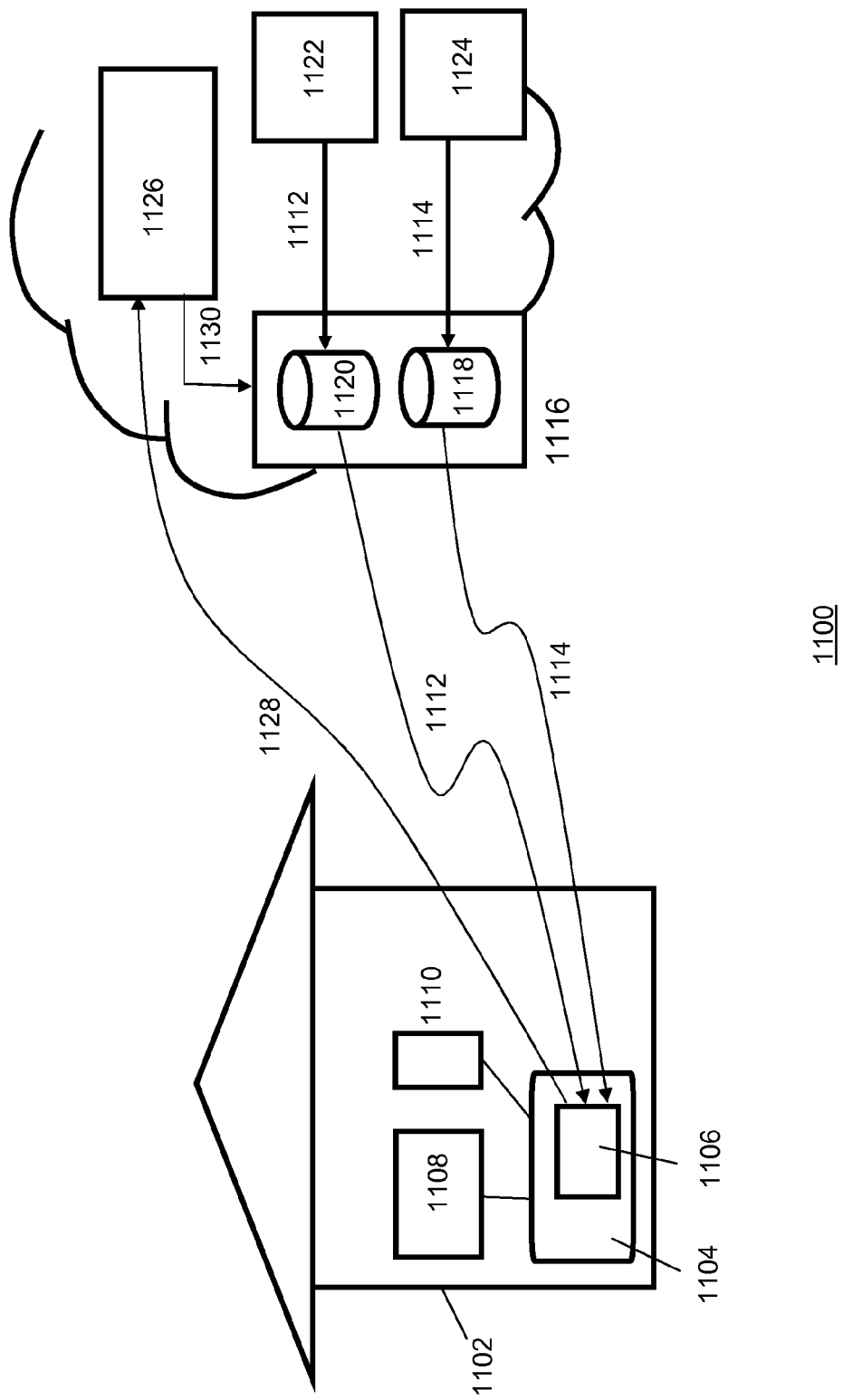
FIG. 11 depicts a schematic of at least part at least part of a content delivery system according to a further variant.

FIG. 11 shows the application of this invention in the context of another type of synchronization. Instead of splitting the Synchronization Client into a BSC and a MSC for the purposes of inter-destination synchronization, FIG. 11 depicts an application for inter-stream synchronization (i.e. lip-sync). FIG. 11 illustrates a case of distribution of a media stream, which is enriched by an extra media stream from another source. An example of such extra media stream may be a different audio stream, e.g. a different commentator in a sport game broadcast. This different audio stream may be generated at a different source then the original game broadcast, so inter-stream synchronization has to be arranged separately.

In this particular situation, inter-stream synchronization may suffer from the same problems as inter-destination synchronization. For example the audio may be produced in response to the original broadcast. This would mean that a person viewing the original broadcast may have to buffer the video-stream for quite a number of seconds before receiving the alternative audio stream. Moreover, the equipment may not be arranged for buffering for extended periods of time as play-out equipment is usually arranged for (jitter) buffering for only a short period of time (i.e. in the order of 100 ms). Another problem relates to the fact that also in this case, the channel changing delays may become very long. A situation wherein, after a channel change, a video has to be buffered for several seconds before the alternative audio stream becomes available that matches the timing of the video, leads to unacceptable channel changing delays.

In that situation the use of synchronization client comprising a combined MSC/BSC in the network will not provide the proper synchronizing functionality. This is due to the fact that usually the video requires buffering for a longer period of time than the audio because current video encoding schemes such as MPEG make use of different type of frames, e.g. I-frames, B-frames and P-frames. If such video encoding scheme follows a bi-directional encoding method, certain frames may be dependent for decoding on earlier frames, some on future frames and some on both. Hence a number of frames are needed for decoding certain frames, so these frames need to be buffered before decoding of those frames may be started. Hence, to solve these issues a synchronization scheme is desired, wherein the BSC and MSC are located at separate points along the media paths between the one or more media sources and the UE.

FIG. 11 shows a home environment 1102 comprising an UE 1104 provided with an MSC 1106 for reporting on media unit arrival time information associated with one or more media streams. The UE may be connected to a display 1108 and an audio output device 1110. The UE receives a video stream 1112 and a separate associated audio stream 1114. Both the video and the audio streams may pass through a BSC 1116 located in the network in the media paths of the video and audio stream and comprising separate BSC buffers 1118, 1120 for buffering the audio and video streams respectively. The BSC may receive the video stream and the audio stream from two separate media sources 1122,1124 somewhere located in the network. An MSAS 1126 may receive status information reports 1128 from the MSC, calculate on the basis of the status information reports synchronization settings instructions 1130, which are subsequently sent to the BSC.

The UE thus receives two or more separate media streams, in this case an audio and a video stream (which may or may not originate from different media sources in the network) that belong together. In order to perform inter-stream synchronization, an UE may receive RTCP Sender Reports as specified in IETF RFC 3550. These RTCP Sender Reports are sent from the media source to the UE and may comprise the relation between the time a media packet was sent (or more specific: sampled) and the RTP timestamp of the corresponding RTP media stream. Inter-stream synchronization may thus be achieved by matching the time the different media packets of the different streams are sent (or more specific: sampled), and by subsequently looking for the corresponding RTP timestamps of the different media streams.

In order for an MSAS to be able to calculate delay settings instructions, it needs the correlation time between the different streams. If both streams are sent from the same source or are sent using the same sampling time for related media packets, the normal RTCP procedure still applies. In that case, the MSAS needs the information contained in the RTCP Sender Reports to correlate the timestamps reported in the synchronization status information sent by the MSC.

This information for correlating the timestamps may be obtained in various ways, e.g. by routing RTCP Sender Reports to the MSAS. For example, the UE may forward Sender Reports to the MSAS or the network may send a copy of Sender Reports to the MSAS. Another way to obtain this information is by placing the MSAS in the network in the signaling path of the RTCP messages. This may be achieved for example by co-locating the MSAS with a BSC.

If the different media streams do not originate from the same source, or do not use the same sampling time for related media packets, the MSAS still requires information on the correlation between the timestamps in the status information reports associated with the audio and video streams. In one embodiment, the correlation information may be supplied manually, e.g. by someone who is presented both streams and who may manually change delays to achieve synchronization. Once synchronization is achieved, the manually introduced delay may be reported and send to the MSAS. In another embodiment the sources of the media packets may supply the correlation between the timestamps in the synchronization status information. For example, if a second media stream is created in response to another first media stream, the source of that second media stream may report on the correlation between the sampling time of the second media stream and that of the first media stream (contained in the RTCP Sender Reports received by the source of the second media stream).

In this context other problems may also arise. If the audio and video stream are received by separate UEs, then these UEs cannot perform inter-stream synchronization because they are not aware of the media packet arrival times reported by each UE. If however the BSC is located in the network, both UEs may comprise a MSC and report the BSC on arrival times. The BSC may then perform the necessary buffering to achieve inter-stream synchronization on behalf of the different UEs.

Figure 12:
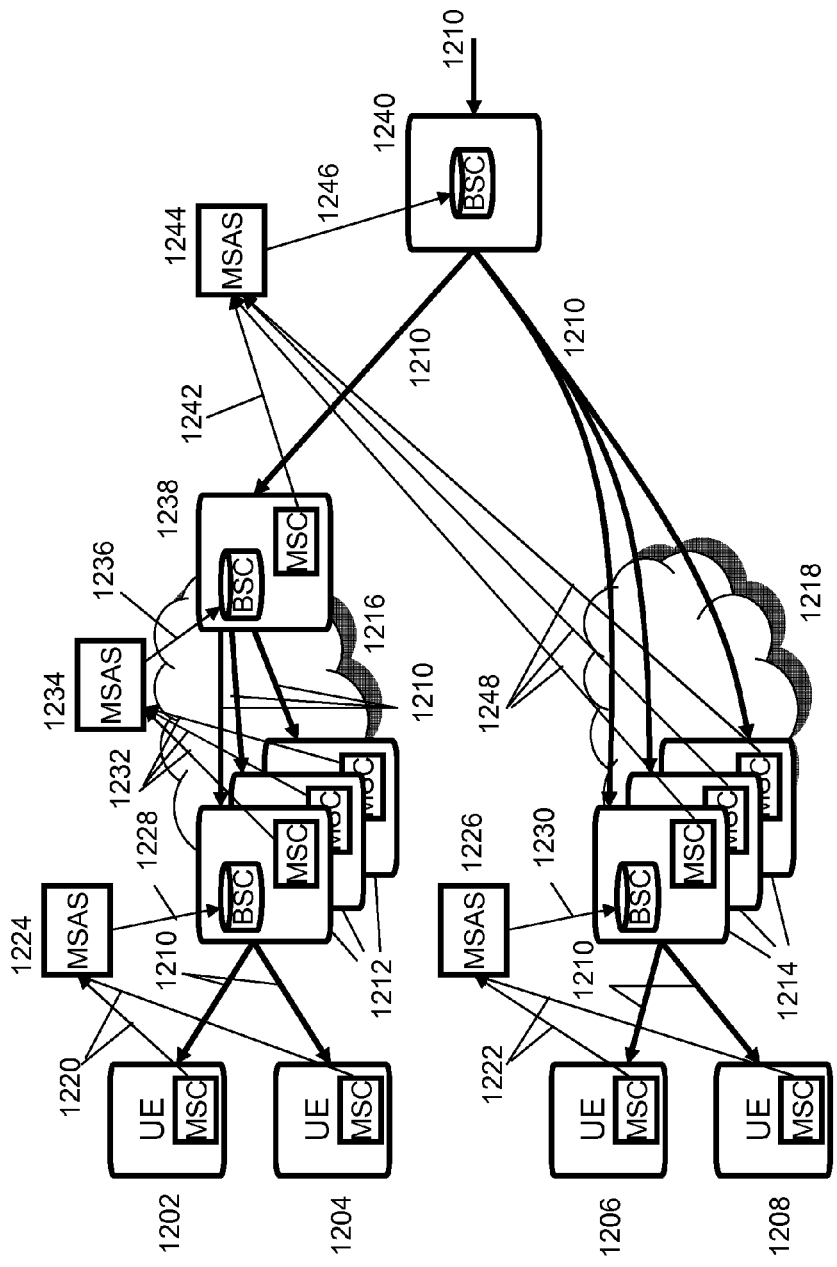
FIG. 12 depicts a schematic of at least part of a content delivery system according to yet a further variant.

FIG. 12 depicts a media distribution network comprising a distributed synchronization system according to one embodiment of the invention. Introduction of such distributed architecture may provide some advantages. For example, delay differences may occur on various parts of the network path of a media distribution. Hence, depending on the origin of the differences in delay, it may be advantageous to compensate for delays in different places. Further, in advance it is unknown whether any UEs or network nodes down the media path(s) may be capable of providing synchronization functionality. By introducing synchronization functions on different nodes in the network, the best synchronization may be achieved given the synchronization capabilities of the different network nodes. Moreover, even if inter-destination synchronization on the UEs may finally be achieved, channel changing times will be lower if the media stream is synchronized to a certain degree in the network.

FIG. 12 depicts UEs 1202-1208 all receiving a media stream 1210. The UEs are connected to some network node 1212,1214, e.g. an edge-node of a network 1216,1218. Each of the UEs send synchronization status information 1220, 1222 to an MSAS 1224,1226. These MSAS's may calculate delay settings instructions 1228,1230 and sent these the network nodes 1212,1214. This will enable the UEs to be (locally) synchronized.

The different network nodes 1212 may also receive the media stream 1210 out of sync. Even if complete inter-destination synchronization, including MSC and BSC functionality, is performed on UEs, it may be advantageous to at least synchronize these network nodes. Suppose one of the network nodes 1212 is 1 second behind on the other network nodes for a certain media stream. Without synchronization on the network node, every UE behind all the other network nodes would have to buffer for this 1 second to achieve inter-destination synchronization. By buffering the difference on these network nodes 1212, the channel changing times of these UEs will decrease by that 1 second. The other advantage is, if some of the UEs 1202,1204 are unable to perform inter-destination synchronization, they will still receive media stream 1210 mostly synchronized.

The network nodes 1212 may sent synchronization status information 1232 to a further MSAS 1234, which may calculate and sent further synchronization settings instructions 1236 to network node 1238 containing the BSC. The advantage of buffering at a network node earlier in the media path, is that the total amount of buffer memory is reduced: the different network nodes 1212 may share the buffer contained in network node 1238. Also, if any of the nodes (network nodes or UEs) on the downstream path of the media stream are unable to perform buffering for inter-destination media synchronization, the media stream may still be synchronized to a certain extend.

These different inter-destination synchronizations can occur on different levels. In network 1212 the network nodes 1212 are synchronized internally in the network in node 1238, and in network 1218 the network nodes 1214 are synchronized by using yet another network node 1240 even higher in the network hierarchy. With higher in the network hierarchy, a node is meant that is earlier in the path of the media stream. In this example a core network node 1238 is synchronized by sending synchronization status information 1242 to MSAS 1244. This MSAS 1244 may calculate and send synchronization settings instructions 1246 to network node 1240 comprising an BSC. This network node 1240 may be for example a distribution point for delivering media streams to different networks and network operators. But, from network 1218 the edge nodes 1214 also sent synchronization status information 1248 to MSAS 1244, thereby using the same BSC in network node 1240.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Further, the invention is not limited to IMS but may also be implemented on the basis of a Soft Switch design whereby the basic user subscription functions, the IP session management and the specific VoIP service functions are fully or partially integrated within one or more trusted application servers residing in the network. Moreover, implementations of the invention using other service provisioning networks such as 3GPP Long Term Evolution (LTE) or 3GPP Service Architecture Evolution (SAE) networks are also foreseen. Moreover, the invention is not limited to the embodiments described above, which may be varied within the scope of the accompanying claims.

The invention claimed is:

1. Method for synchronizing a first and second media stream, said first and second media stream being transmitted by at least one media source in a network via a first and second media path to one or more terminals, the method comprising:
 measuring timing information associated with arrival times of media packets in said first and second media stream using a measuring module positioned at a first location in said first and second media paths;
 generating buffer instructions for at least one buffer on the basis of said timing information, said buffer being positioned at a second location in at least one of said first or second media path; and,
 delaying one or more media packets transmitted over said media path to said one or more terminals such that arrival times of media packets at said one or more terminals are substantially synchronized, wherein said measuring module is located in said one or more terminals or at a position along one or more access-lines connecting said one or more terminals to said network; and wherein said buffer is located in said network.

2. Method according to claim 1, wherein said first media path is provided between said media source and a first terminal and said second media path is provided between said media source and a second terminal.

3. Method according to claim 1, wherein said buffer instructions are generated by a synchronization server, and wherein said measuring module and said buffer are configured as synchronization measuring client and a synchronization buffering client respectively, the method further comprising:
receiving timing information from said synchronization measuring client; and,
transmitting buffer instructions to said synchronization buffering client.

4. Method according to claim 3, wherein said buffer instructions are sent in one or more synchronization settings instructions reports to the synchronization buffering client; and/or wherein said timing information is sent in one or more synchronization status information reports to the synchronization server.

5. Method according to claim 4, wherein said synchronization status information reports are sent via said synchronization buffering client to said synchronization server.

6. Method according to claim 5, wherein said synchronization buffering client is configured to modify synchronization status information reports sent from a terminal to the synchronization server; and/or wherein said synchronization buffering client is configured to forward synchronization settings instructions reports to a terminal.

7. Method according to claim 1, wherein said first media path is provided between a first media source and a terminal and said second media path is provided between said first media source or a further second media source and said terminal.

8. Method according to claim 1, wherein at least one of said one or more terminals is configured to measure variations between the arrival times of media packets in a media stream and to determine on the basis of said arrival time measurement whether a variation relates to a delay originating from a buffering point.

9. Method according to claim 1, wherein said buffer comprises a variable delay buffer which is configured to delay a media stream on the basis of delay instructions received from the network, said delay being selected between 0.5 and 10 seconds; and/or wherein said buffer is shared between two or more terminals connected to said buffer.

10. Method according to claim 1, wherein said buffer is located in a border network node and/or access network node.

11. Method according to claim 3, wherein the synchronization server comprises a media synchronization application server.

12. Method according to claim 4, wherein said synchronization settings instructions reports comprise RTCP synchronization settings instructions reports. instructions to said one or more terminals.

13. Method according to claim 9, wherein said delay is selected between 1 and 5 seconds.

14. Method for synchronizing a first and second media stream, said first and second media stream being transmitted by at least one media source in a network via a first and second media path to one or more terminals, the method comprising:
measuring timing information associated with arrival times of media packets in said first and second media stream using a measuring module positioned at a first location in said first and second media paths;
generating buffer instructions for at least one buffer on the basis of said timing information, said buffer being positioned at a second location in at least one of said first or second media path; and,
delaying one or more media packets transmitted over said media path to said one or more terminals such that arrival times of media packets at said one or more terminals are substantially synchronized, wherein said first measuring module is located in a network node and wherein said buffer is located in said one or more terminals or at a position along one or more access-lines connecting said one or more terminals to said network.

15. Method according to claim 14, wherein said network node comprises a border network node and/or access network node.

16. System for synchronizing a first and second media stream, the system comprising:
at least one media source transmitting a first and second media stream via a first and second media path to one or more terminals;
at least one measuring module for measuring timing information associated with media packets in said first and second media stream received by said at least one measuring module, said measuring module being positioned at a first location in said first and second media paths;
at least one buffer being configured to delay media packets transmitted over a media path to said one or more terminals on the basis of delay instructions, said buffer being positioned at a second location in at least one of said first or second media paths; and,
a synchronization server for generating buffer instructions for said at least one buffer on the basis of said timing information such that arrival times of media packets at said one or more terminals are substantially synchronized,
wherein said measuring module is located in said one or more terminals or at a position along one or more access-lines connecting said one or more terminals to said network; and wherein said buffer is located in said network.

17. A buffer module for use in a system according to claim 16, said buffer module being configured to delay media transmitted over a media path to a terminal on the basis of synchronization settings instructions; said buffer module comprising:
a variable delay buffer;
a receiver for receiving synchronization settings instructions, said synchronization settings instructions providing the variable delay with information for delaying a media stream for a predetermined delay period; and
a sender for transmitting one or more delayed media streams to one or more terminals, said buffer module further configured to forward said synchronization settings instructions to said one or more terminals.

18. The system according to claim 16, said synchronization server comprising:
a receiver configured for receiving timing information associated with arrival times of media packets in one or more media streams, said timing information comprising timestamps of said media packets;
said receiver being further configured for receiving correlation information on the correlation between timestamps of media packets associated with different media streams;
a processor configured to generate buffer instructions, said buffer instructions comprising delay information calculated on the basis of the timing information and said correlation information;

a sender for transmitting the buffer instructions to at least one buffer.

19. A terminal for media play-out, said terminal being configured for use in a system according to claim 16, said terminal comprising:
- a measuring module for measuring timing information associated with arrival times of media packets received by the terminal;
- a sender for transmitting timing information to a synchronization server in the network; and
- a measuring unit for measuring variations between the arrival time of media packets in a media stream and determining, on the basis of said measurement, whether a variation relates to jitter or to deliberately introduced delay originating from a buffering point.

20. Buffer module according to claim 17, further comprising a buffer list comprising pointer information, said pointer information allowing the buffer module to share the media packets in the variable delay buffer amongst two or more terminals.

21. Buffer module according to claim 17, wherein said buffer module comprises a synchronization buffering client.

22. A non-transitory computer readable storage medium containing a set of instructions that, when executed by a processor, performs a method for synchronizing a first and second media stream, said first and second media stream being transmitted by at least one media source in a network via a first and second media path to one or more terminals, the method comprising:
- measuring timing information associated with arrival times of media packets in said first and second media stream using a measuring module positioned at a first location in said first and second media paths;
- generating buffer instructions for at least one buffer on the basis of said timing information, said buffer being positioned at a second location in at least one of said first or second media path; and,
- delaying one or more media packets transmitted over said media path to said one or more terminals such that arrival times of media packets at said one or more terminals are substantially synchronized, wherein said measuring module is located in said one or more terminals or at a position along one or more access-lines connecting said one or more terminals to said network; and wherein said buffer is located in said network.

23. System for synchronizing a first and second media stream, the system comprising:
- at least one media source transmitting a first and second media stream via a first and second media path to one or more terminals;
- at least one measuring module for measuring timing information associated with media packets in said first and second media stream received by said at least one measuring module, said measuring module being positioned at a first location in said first and second media paths;
- at least one buffer being configured to delay media packets transmitted over a media path to said one or more terminals on the basis of delay instructions, said buffer being positioned at a second location in at least one of said first or second media paths; and,
- a synchronization server for generating buffer instructions for said at least one buffer on the basis of said timing information such that arrival times of media packets at said one or more terminals are substantially synchronized,
- wherein said first measuring module is located in a network node and wherein said buffer is located in said one or more terminals or at a position along one or more access-lines connecting said one or more terminals to said network.

24. A non-transitory computer readable storage medium containing a set of instructions that, when executed by a processor, performs a method for synchronizing a first and second media stream, said first and second media stream being transmitted by at least one media source in a network via a first and second media path to one or more terminals, the method comprising:
- measuring timing information associated with arrival times of media packets in said first and second media stream using a measuring module positioned at a first location in said first and second media paths;
- generating buffer instructions for at least one buffer on the basis of said timing information, said buffer being positioned at a second location in at least one of said first or second media path; and,
- delaying one or more media packets transmitted over said media path to said one or more terminals such that arrival times of media packets at said one or more terminals are substantially synchronized, wherein said first measuring module is located in a network node and wherein said buffer is located in said one or more terminals or at a position along one or more access-lines connecting said one or more terminals to said network.

* * * * *

UNITED STATES PATENT AND TRADEMARK OFFICE
CERTIFICATE OF CORRECTION

PATENT NO.        : 8,839,340 B2  
APPLICATION NO.   : 13/522974  
DATED             : September 16, 2014  
INVENTOR(S)       : Mattijs Oskar Van Deventer et al.

Page 1 of 1

It is certified that error appears in the above-identified patent and that said Letters Patent is hereby corrected as shown below:

In the Claims

Claim 12, Column 27, Lines 56-57, delete "instructions to said one or more terminals."

Signed and Sealed this  
Thirteenth Day of January, 2015

Michelle K. Lee  
*Deputy Director of the United States Patent and Trademark Office*